(12) United States Patent
Ishido et al.

(10) Patent No.: US 8,035,865 B2
(45) Date of Patent: *Oct. 11, 2011

(54) ORIGINAL SIZE DETECTING APPARATUS, ORIGINAL SIZE DETECTING METHOD, AND PROGRAM FOR ORIGINAL SIZE DETECTION

(75) Inventors: Katsuhiro Ishido, Ibaraki (JP); Takashi Soya, Chiba (JP)

(73) Assignee: Canon Kabushiki Kaisha (JP)

( * ) Notice: Subject to any disclaimer, the term of this patent is extended or adjusted under 35 U.S.C. 154(b) by 60 days.

This patent is subject to a terminal disclaimer.

(21) Appl. No.: 12/345,273

(22) Filed: Dec. 29, 2008

(65) Prior Publication Data

US 2009/0122357 A1  May 14, 2009

Related U.S. Application Data

(63) Continuation of application No. 10/787,043, filed on Feb. 25, 2004, now Pat. No. 7,471,424, and a continuation of application No. 12/275,281, filed on Nov. 21, 2008.

(30) Foreign Application Priority Data

Feb. 26, 2003  (JP) ................................ 2003-049699
Feb. 28, 2003  (JP) ................................ 2003-054162

(51) Int. Cl.
  *H04N 1/32* (2006.01)
  *H04N 1/393* (2006.01)
(52) U.S. Cl. ........ 358/449; 358/451; 358/475; 358/509; 358/477; 399/379; 399/380; 399/47
(58) Field of Classification Search .................... None
See application file for complete search history.

(56) References Cited

U.S. PATENT DOCUMENTS

| | | | |
|---|---|---|---|
| 4,764,788 A * | 8/1988 | Watashi et al. | 399/214 |
| 5,296,944 A | 3/1994 | Suzuki et al. | |
| 5,453,818 A | 9/1995 | Maehara et al. | |
| 5,973,797 A | 10/1999 | Tanaka et al. | |
| 7,471,424 B2 * | 12/2008 | Ishido et al. | 358/449 |
| 2001/0035987 A1 * | 11/2001 | Ishido et al. | 358/475 |
| 2003/0107784 A1 * | 6/2003 | Togashi | 358/528 |

FOREIGN PATENT DOCUMENTS

JP  62-47026 B2  10/1987
(Continued)

OTHER PUBLICATIONS

Specification and drawings of unpublished related co-pending US. Appl. No. 12/275,281, filed Nov. 21, 2008. "Original Size Detecting Apparatus, Original Size Detecting Method, and Program for Original Size Detection"; Katsuhiro Ishido et al.; spec. pp. 1-42; drawings pp. 1-22.

*Primary Examiner* — Sudhanshu Pathak
*Assistant Examiner* — Huo Long Chen
(74) *Attorney, Agent, or Firm* — Rossi, Kimms & McDowell LLP

(57) ABSTRACT

An original size detecting apparatus is capable of carrying out accurate original size detection without erroneous detection of the size of an original due to the influence of external scattered light. A CCD reads reflected light of light irradiated from a light source onto an original placed on an original platen glass. Optical sensors detect two open states of the original presser plate, and a scanner controller performs predetermined control corresponding to each of the open states of the original presser plate detected by the optical sensors, to determine the size of the original based on the result of the reading by the CCD.

6 Claims, 22 Drawing Sheets

FOREIGN PATENT DOCUMENTS

| | | |
|---|---|---|
| JP | 5-207239 A | 8/1993 |
| JP | 08-204912 A | 8/1996 |
| JP | 08-223372 A | 8/1996 |
| JP | 9-135330 A | 5/1997 |
| JP | 9-329848 A | 12/1997 |
| JP | 2001-324770 A | 11/2001 |
| JP | 2001-346009 A | 12/2001 |

* cited by examiner

FIG. 14

| RESULT OF DETERMINATION BASED ON DETECTION IN MAIN-SCANNING DIRECTION | RESULT OF DETERMINATION BASED ON DETECTION BY ORIGINAL SIZE SENSOR | |
|---|---|---|
| | ORIGINAL PRESENT | ORIGINAL ABSENT |
| B5R, B6 | B5R | B6 |
| A4R, A5 | A4R | A5 |
| B5, B4 | B4 | B5 |
| A4, A3 | A3 | A4 |

ORIGINAL SIZE DETECTING APPARATUS, ORIGINAL SIZE DETECTING METHOD, AND PROGRAM FOR ORIGINAL SIZE DETECTION

This is a continuation of U.S. patent application Ser. No. 10/787,043 filed Feb. 25, 2004, and Ser. No. 12/275,281 filed Nov. 21, 2008, both of which are based on and claim priority from Japanese Applications No. 2003-049699 filed on Feb. 26, 2003 and 2003-054162 filed on Feb. 28, 2003. The contents of each are incorporated herein in their entirety by reference.

BACKGROUND OF THE INVENTION

1. Field of the Invention

The present invention relates to an original size detecting apparatus, an original size detecting method, and a program for original size detection, which are applied e.g. to a digital copying machine, a scanner, and a facsimile machine, for detecting the size of an original subjected to image reading.

2. Description of the Related Art

Conventionally, various types of original size detecting apparatuses for detecting the size of an original subjected to image reading have been proposed. For example, there has been proposed an original size detecting apparatus of a type in which the leading end of an original is irradiated by a light source, reflected light from the original is read by a CCD (charge coupled device), and at the same time the dimension of the original in the sub-scanning direction is detected by an original size sensor, whereafter the size of the original is detected based on the result of the reading by the CCD and that of the detection by the original size sensor (see Japanese Laid-Open Patent Publication (Kokai) No. H05-207239).

In the above-mentioned type of original size detecting apparatus, the width of an original in the main-scanning direction is detected using the CCD for use in original reading, the number of original size sensors can be reduced, which enables low-cost and efficient detection of original size.

Further, there has been proposed an original size detecting apparatus of another type which detects the size of an original by sensing opening/closing of an original presser plate that presses an original subjected to image reading against the upper surface of an original platen glass as well as an open state of the original presser plate (see Japanese Laid-Open Patent Publication (Kokai) No. H09-329848).

Original size detection is basically possible by either one of the above-mentioned types. However, when reflected light from an original is read, external scattered light, such as indoor light, from outside the original size detecting apparatus is also read simultaneously. As a result, the reflected light from the original cannot be distinguished from the external scattered light, which can cause erroneous detection of the size of the original.

To prevent the influence of external scattered light, there has been proposed an original size detecting apparatus of a type which detects the original size when an original presser plate is closed. In this type, for example, the color density of the underside surface of the original presser plate is reduced so as to enable detection of a white original (see Japanese Patent Publication (Kokoku) No. S62-47026).

However, in the above-mentioned type in which the color density of the underside surface of the original presser plate is reduced so as to enable detection of a white original, original size detection is possible, but there occurs a "show-through" phenomenon that the background of the original is darkened at the time of reading the original. This "show-through" phenomenon is conspicuous in reading an original with high transmittance, such as a mother print, which causes inconvenience in reading an original.

To prevent the influence of external scattered light, there has been also proposed another type of original size detecting apparatus in which after opening/closing of an original presser plate that presses an original subjected to image reading is detected, distribution of external scattered light detected when the original presser plate is open is stored, and the surface of the original is scanned with a light source turned on when the original presser plate is closed, and then the stored distribution of external scattered light is subtracted from a reflected light signal outputted from a photoelectric conversion means having received the reflected light, to thereby determine the size of the original (see Japanese Laid-Open Patent Publication (Kokai) No. H09-135330).

However, even this type can cause erroneous detection of the size of the original, when the amount of light irradiated from the light source used to scan the original surface is decreased for energy saving purposes while increasing the sensitivity of the photoelectric conversion means so that external scattered light can be detected with very high sensitivity, or when an original subjected to reading is formed of a sheet having a high transmittance, such as a mother print, the photoelectric conversion means senses the influence of the external scattered light.

SUMMARY OF THE INVENTION

It is an object of the present invention to provide an original size detecting apparatus, an original size detecting method, and a program for original size detection, which are capable of carrying out accurate original size detection without erroneous detection of the size of an original due to the influence of external scattered light.

To attain the above object, in a first aspect of the present invention, there is provided an original size detecting apparatus comprising an original platen, an original presser plate that presses an original placed on the original platen, a light source that irradiates light onto the original, a reflected light-reading device that reads reflected light of the light irradiated from the light source onto the original, an open state-detecting device that detects at least two open states of the original presser plate, and an original size-determining device that performs predetermined control corresponding to each of the open states of the original presser plate detected by the open state-detecting device, to determine a size of the original based on a result of the reading by the reflected light-reading device.

With the arrangement of the original size detecting apparatus according to the first aspect of the present invention, it is possible to detect the size of an original in a state where the opening angle of the original presser plate is so small that external scattered light does not easily enter the apparatus and at the same time achieve original size detection in a manner being tolerant to external scattered light.

To attain the above object, in a second aspect of the present invention, there is provided an original size detecting apparatus comprising an original platen, an original presser plate that presses an original placed on the original platen, a light source that irradiates light onto the original, a reflected light-reading device that reads reflected light of the light irradiated from the light source onto the original, an open state-detecting device that detects at least two open states of the original presser plate, and an original size-determining device that turns on the light source and the reflected light-reading device when it is detected by the open state-detecting device that the original presser plate is in a first open state, and determines a size of the original based on an output from the reflected light-reading device when it is detected by the open state-detecting device that the original presser plate is in a second open state where an opening angle thereof is smaller than when the original presser plate is in the first open state.

With the arrangement of the original size detecting apparatus according to the second aspect of the present invention, turning-on of the light source and the reflected light-reading device and execution of an original size-detecting process are carried out efficiently according to the open state of the original presser plate. Therefore, it is possible to carry out accurate original size detection while suppressing occurrence of erroneous detection due to external scattered light. Further, this contributes to saving of energy consumption by the original size detecting apparatus.

Preferably, the original size-determining device is operable when the original presser plate is in an open state where the opening angle thereof is larger than when the original presser plate is in the first open state, to turn off the light source and the reflected light-reading device.

Preferably, the original size detecting apparatus comprises a sub-scanning direction dimension-detecting device that detects a dimension of the original in a sub-scanning direction, and the original size-determining device determines the size of the original based on an output from the sub-scanning direction dimension-detecting device and an output from the reflected light-reading device.

To attain the above object, in a third aspect of the present invention, there is provided an original size detecting apparatus comprising an original platen that supports an original to be read, a light source that irradiates light onto the original, a first detecting device that detects whether or not a dimension of the original in a sub-scanning direction is equal to or smaller than a predetermined dimension, a second detecting device that detects a dimension of the original in a main-scanning direction orthogonal to the sub-scanning direction, and a control and determining device that controls the first and second detecting devices to determine a size of the original based on respective results of detections by the first and second detecting devices, wherein the control and determining device carries out a first original size-determining process when an output from the second detecting device indicative of a result of detection carried out thereby with the light source turned off contains components having smaller values than a predetermined output value, and carries out a second original size-determining process when the output from the second detecting device indicative of the result of detection carried out thereby is equal to or larger than the predetermined output value.

With the arrangement of the original size detecting apparatus according to the third aspect of the present invention, it is possible to achieve more accurate original size detection.

Preferably, the first original size-determining process comprises excluding points on the original platen corresponding to values of the output from the second detecting device which are equal to or larger than the predetermined output value, and determining the size of the original based on a result of detection carried out again by the second detecting device with the light source turned on, and a result of the detection carried out by the first detecting device.

Preferably, the second original size-determining process comprises detecting an edge in the output from the second detecting device indicative of the result of the detection carried out thereby with the light source turned off, by comparing the output with a threshold value, determining a position on the original platen where the edge has been detected as a position of an end of the original, and then determining the size of the original based on the result of the detection by the first detecting device and the position of the end of the original.

To attain the above object, according to a fourth aspect of the present invention, there is provided an original size detecting method comprising a reflected light-reading step of reading reflected light of light irradiated from a light source onto an original which is placed on an original platen and pressed by an original presser plate, an open state-detecting step of detecting at least two open states of the original presser plate, and an original size-determining step of performing predetermined control corresponding to each of the open states of the original presser plate detected in the open state-detecting step, to determine a size of the original based on a result of the reading in the reflected light-reading step.

Further, to attain the above object, in a fifth aspect of the present invention, there is provided an original size detecting method comprising a reflected light-reading step of causing a reflected light-reading device to read reflected light of light irradiated from a light source onto an original which is placed on an original platen and pressed by an original presser plate, an open state-detecting step of detecting at least two open states of the original presser plate, and an original size-determining step of turning on the light source and the reflected light-reading device when it is detected in the open state-detecting step that the original presser plate is in a first open state, and determining a size of the original based on an output from the reflected light-reading device in the reflected light-reading step when it is detected in the open state-detecting step that the original presser plate is in a second open state where an opening angle thereof is smaller than when the original presser plate is in the first open state.

Preferably, when the original presser plate is in an open state where the opening angle thereof is larger than when the original presser plate is in the first open state, the original size-determining step comprises turning off the light source and the reflected light-reading device.

Preferably, the original size detecting method comprises a sub-scanning direction dimension-detecting step of detecting a dimension of the original in a sub-scanning direction, and the original size-determining step comprises determining the size of the original based on an output obtained in the sub-scanning direction dimension-detecting step and an output obtained in the reflected light-reading device.

To attain the above object, in a sixth aspect of the present invention, there is provided an original size detecting method applied to an original size detecting apparatus including an original platen that supports an original to be read, and a light source that irradiates light onto the original, the method comprising a first detecting step of detecting whether or not a dimension of the original in a sub-scanning direction is equal to or smaller than a predetermined dimension and generating an output indicative of a result of the detection, a second detecting step of detecting a dimension of the original in a main-scanning direction orthogonal to the sub-scanning direction and generating an output indicative of a result of the detection, and a control and determining step of controlling the first and second detecting steps to determine a size of the original based on respective results of detections in the first and second detecting steps, wherein the control and determining step comprises carrying out a first original size-determining process when the output indicative of the result of detection carried out in the second detecting step with the light source turned off contains components having smaller values than a predetermined output value, and carrying out a second original size-determining process when the output indicative of the result of the detection in the second detecting step is equal to or larger than the predetermined output value.

Preferably, the first original size-determining process comprises excluding points on the original platen corresponding to values of the output generated in the second detecting step which are equal to or larger than the predetermined output value, and determining the size of the original based on a result of detection carried out again in executing the second detecting step with the light source turned on, and the result of the detection carried out in the first detecting step.

Preferably, the second original size-determining process comprises detecting an edge in the output indicative of the result of the detection carried out in the second detecting step with the light source turned off, by comparing the output with a threshold value, determining a position on the original platen where the edge has been detected as a position of an end of the original, and then determining the size of the original based on the result of the detection carried out in the first detecting step and the position of the end of the original.

To attain the above object, in a seventh aspect of the present invention, there is provided an original size detecting program carried out by an original size detecting apparatus including an original platen, an original presser plate that presses an original placed on the original platen, and a light source that irradiates light onto the original, the program comprising a reflected light-reading module for reading reflected light of the light irradiated from the light source onto the original, an open state-detecting module for detecting at least two open states of the original presser plate, and an original size-determining module for performing predetermined control corresponding to each of the open states of the original presser plate detected by the open state-detecting module, to determine a size of the original based on a result of the reading by the reflected light-reading module.

To attain the above object, in an eighth aspect of the present invention, there is provided an original size detecting program executed by an original size detecting apparatus including an original platen, an original presser plate that presses an original placed on the original platen, and a light source that irradiates light onto the original, the program comprising a reflected light-reading module for causing a reflected light-reading device to read reflected light of the light irradiated from the light source onto the original, an open state-detecting module for detecting at least two open states of the original presser plate, and an original size-determining module for turning on the light source and the reflected light-reading device when it is detected by the open state-detecting device that the original presser plate is in a first open state, and determining a size of the original based on an output from the reflected light-reading device when it is detected by the open state-detecting module that the original presser plate is in a second open state where an opening angle thereof is smaller than when the original presser plate is in the first open state.

To attain the above object, in a ninth aspect of the present invention, there is provided an original size detecting program executed by an original size detecting apparatus including an original platen that supports an original to be read, and a light source that irradiates light onto the original, the program comprising a first detecting module for detecting whether or not a dimension of the original in a sub-scanning direction is equal to or smaller than a predetermined dimension and generating an output indicative of a result of the detection, a second detecting device module for detecting a dimension of the original in a main-scanning direction orthogonal to the sub-scanning direction and generating an output indicative of a result of the detection, and a control and determining module for controlling the first and second detecting modules and determining a size of the original based on respective results of detections by the first and second detecting modules, wherein the control and determining module carries out a first original size-determining process when the output indicative of the result of detection carried out by the second detecting module with the light source turned off contains components having smaller values than a predetermined output value, and carries out a second original size-determining process when the output indicative of the result of the detection by the second detecting module is equal to or larger than the predetermined output value.

The above and other objects, features, and advantages of the invention will become more apparent from the following detailed description taken in conjunction with the following drawings.

BRIEF DESCRIPTION OF THE DRAWINGS

FIG. 14 is a diagram useful in explaining the relationship between a result of determination of the dimension of an original in the main-scanning direction and a result of determination by an original size sensor;

DETAILED DESCRIPTION OF THE PREFERRED EMBODIMENTS

Figure 1:
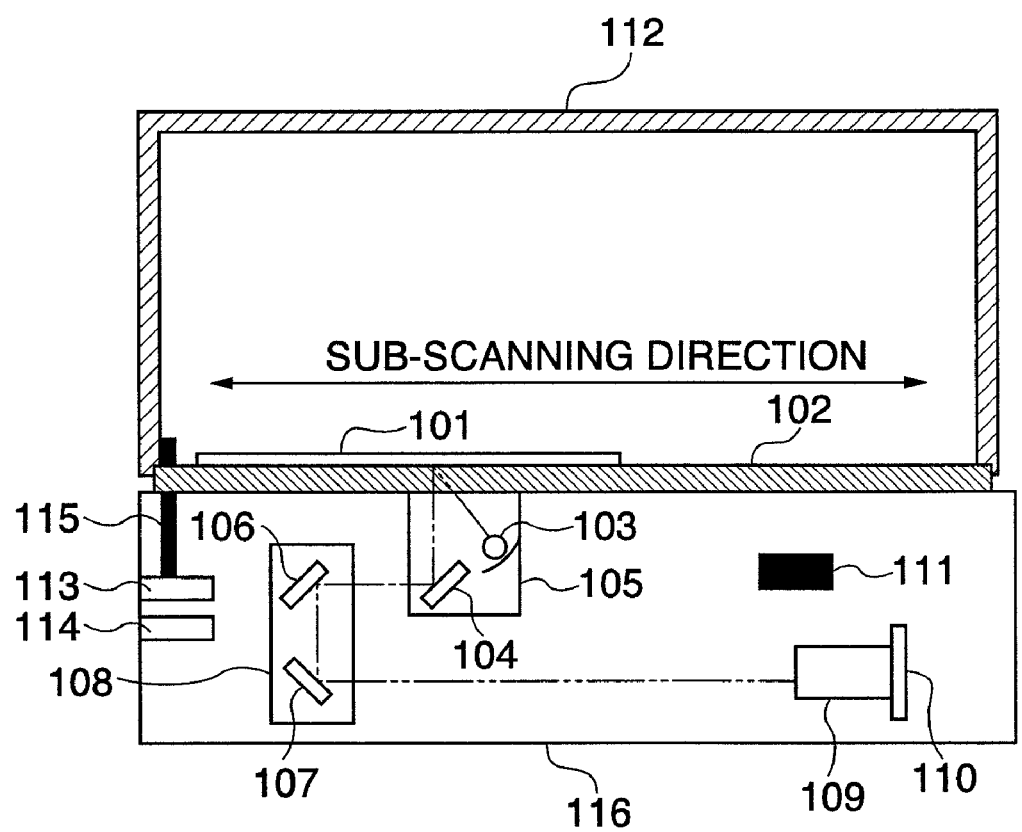
FIG. 1 is a front view schematically showing the construction of an image reading system of an image reading apparatus as an original size detecting apparatus according to a first embodiment of the present invention.

The present invention will now be described in detail below with reference to the accompanying drawings showing preferred embodiments thereof. In the drawings, elements and parts which are identical throughout the views are designated by identical reference numerals, and duplicate description thereof is omitted.

It should be noted that each of the following embodiments is described only by way of example, and various changes and modifications may be made without departing from the spirit and scope of the present invention.

First, a first embodiment of the present invention will be described with reference to FIGS. 1 to 15.

Figure 2:
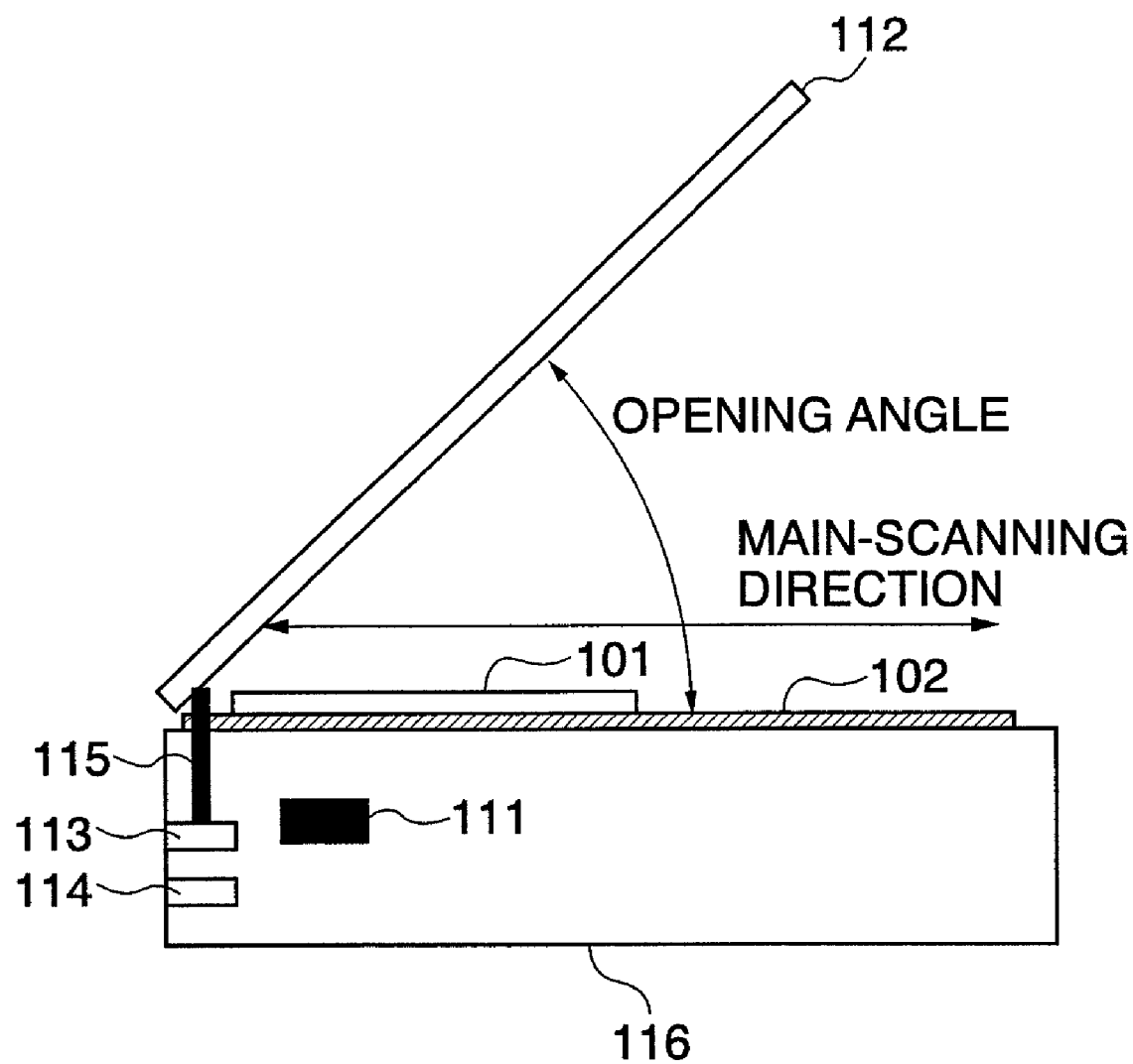
FIG. 2 is a side view schematically showing the construction of the image reading system of the image reading apparatus in FIG. 1.

FIG. 1 is a front view schematically showing the construction of an image reading system of an image reading apparatus as an original size detecting apparatus according to the first embodiment of the present invention. FIG. 2 is a side view of the same, and FIG. 3 is a plan view showing the construction of an original platen glass of the image reading apparatus in FIG. 1.

Figure 3:
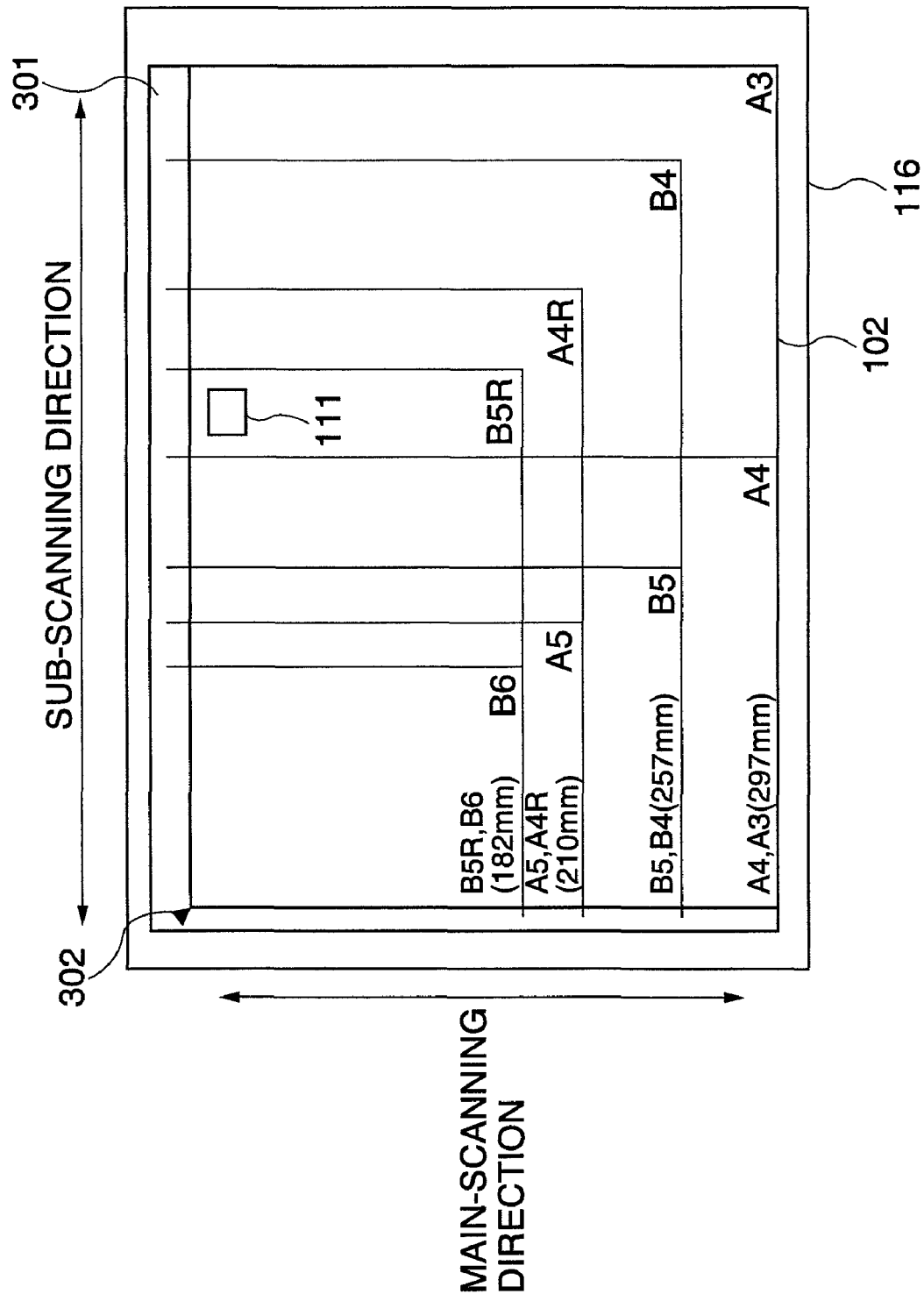
FIG. 3 is a plan view showing the construction of an original platen glass of the image reading apparatus in FIG. 1.

The image reading apparatus shown in FIGS. 1 to 3 is a digital image reading apparatus of a general type.

In FIGS. 1 and 2, reference numeral 101 designates an original, 102 the original platen glass, 103 a light source (lamp), 104 a first mirror, and 105 a first optical bench. Reference numerals 106 and 107 designate second and third mirrors, respectively. Reference numeral 108 designates a second optical bench, 109 a lens, 110 a CCD (charge coupled device), 111 an original size sensor (reflective sensor), and 112 an original presser plate. Reference numerals 113 and 114 designate optical sensors, 115 designates a sensor flag, and 116 designates a housing.

The original platen glass 102 on which an original 101 subjected to image reading is placed is formed of transparent glass. The light source 103 irradiates light onto a surface of the original 101 placed on the original platen glass 102. The first mirror 104 reflects reflected light from the original 101 toward the second mirror 106. The first optical bench 105 accommodates the light source 103 and the first mirror 104.

The second and third mirrors 106 and 107 reflect the light from the first mirror 104 to guide the same to the lens 109 and the CCD 110. The second optical bench 108 accommodates the second and third mirrors 106 and 107. The lens 109 focuses the light from the third mirror 107 on the CCD 110. The CCD 110 converts an optical signal inputted via the lens 109 to an electric signal. The original size sensor 111 detects the dimension in the sub-scanning direction of an original 101 on the original platen glass 102, and outputs a binary signal indicative of the presence or absence of the original 101 on the original platen glass 102 to a scanner controller 403 (see FIG. 4).

The original presser plate 112 presses the original 101 against the upper surface of the original platen glass 102. The original presser plate 112 has a white underside surface so as to prevent a "show-through" phenomenon from occurring in reading of the original 101. The optical sensors 113 and 114 detect two-stage changes in the opening angle of the original presser plate 112. The sensor flag 115 is moved upward and downward by changes in the opening angle of the original presser plate 112, and blocks the optical paths of lights toward the respective optical sensors 113 and 114 when the opening angle has reached respective predetermined degrees, whereby the opening angle of the original presser plate 112 is detected by the optical sensors 113 and 114. The original platen glass 102, the light source 103, the first mirror 104, the first optical bench 105, the second and third mirrors 106 and 107, the second optical bench 108, the lens 109, the CCD 110, the original size sensor 111, the original presser plate 112, the optical sensors 113 and 114, and the sensor flag 115 are all mounted to the housing 116.

As shown in FIG. 3, an original size label 301 is disposed on the perimeter of the original platen glass 102. Also, an original alignment mark 302 is formed at a reference registration position at an inner corner of the original size label 301, which corresponds to an upper left corner of the original platen glass 102 as viewed in FIG. 3. An original of a standard size (A3, A4, A5, A4R, B4, B5, B5R, or B6) is placed on the original platen glass 102 with a corner thereof aligned with the original alignment mark 302, whereby the original is exactly positioned on an area defined by associated lines corresponding to the size of the original, shown in FIG. 3.

Reading of the original 101 is carried out using the image reading apparatus constructed as above.

Figure 4:
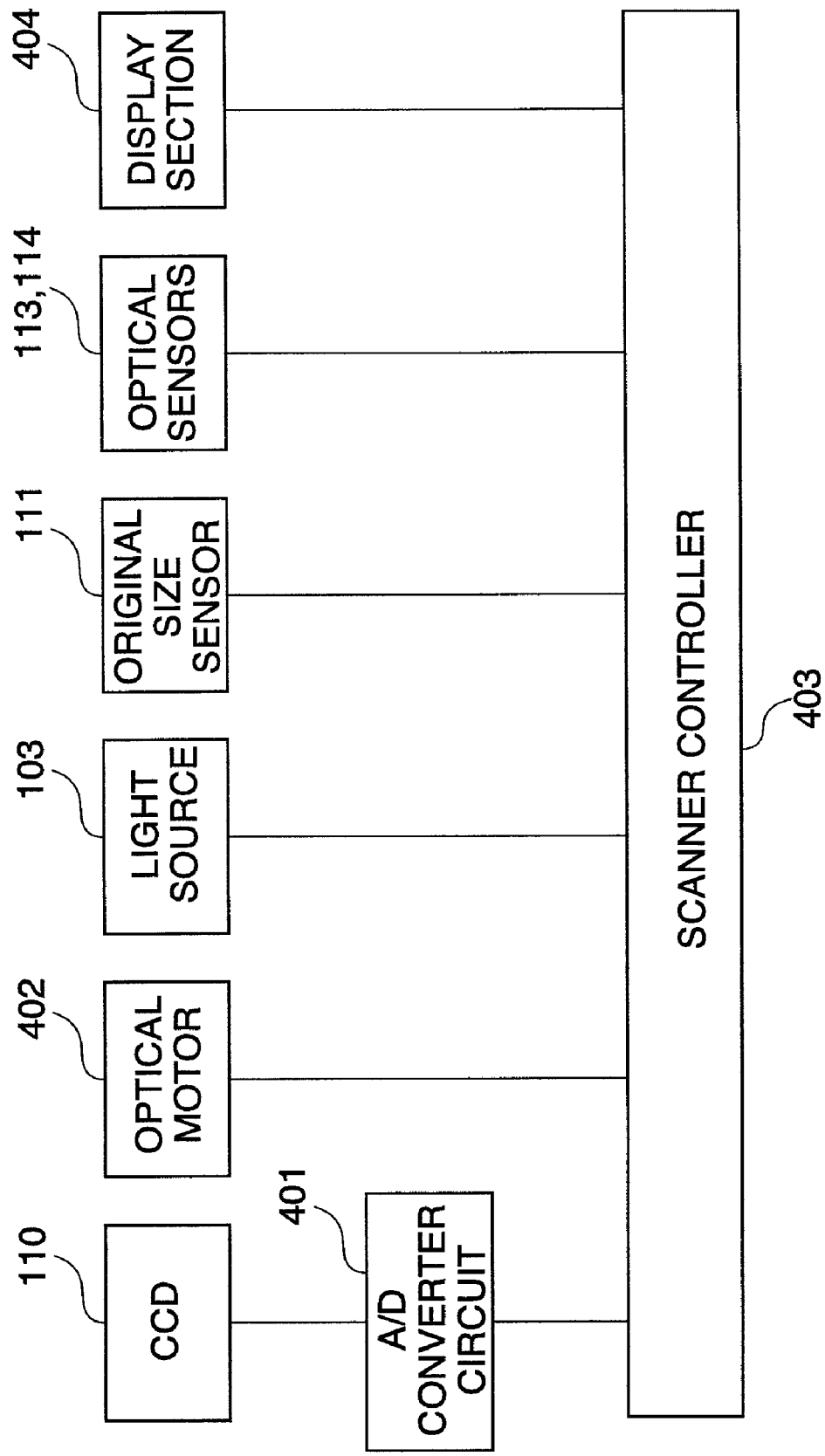
FIG. 4 is a block diagram showing the construction of a control system of the image reading apparatus in FIG. 1.

FIG. 4 is a block diagram showing the configuration of a control system of the image reading apparatus shown in FIG. 1.

As shown in FIG. 4, the control system of the image reading apparatus is comprised of the light source (lamp) 103, the CCD 110, the original size sensor 111, the optical sensors 113 and 114, an A/D converter circuit 401, an optical motor 402, a scanner controller 403, and a display section 404.

The CCD 110 performs reading of the original 101 by receiving reflected light from the surface of the original 101, as described above. The A/D converter circuit 401 performs analog-to-digital conversion of an output signal from the CCD 110. The optical motor 402 drives the first optical bench 105 and the second optical bench 108 to move them for scanning the original 101. The light source 103 irradiates light onto the surface of the original 101 as described above. The original size sensor 111 detects the dimension of the original 101 in the sub-scanning direction as described above. The optical sensors 113 and 114 are adapted to detect 40 degrees and 15 degrees of the opening angle of the original presser plate 112, respectively. The display section 404 displays information indicative of the result of detection of an original size.

The scanner controller 403 controls the CCD 110, the optical motor 402, the light source 103, and the original size sensor 111, and starts original size detection, based on the results of detection of the opening angle of the original presser plate 112 by the optical sensors 113 and 114, and detects the dimension of the original 101 in the main-scanning direction, based on a digital signal outputted from the A/D converter circuit 401. The scanner controller 403 detects the dimension of the original 101 in the sub-scanning direction by the original size sensor 111. Then, the scanner controller 403 determines the size of the original 101 based on the result of the detection of the dimension of the original 101 in the main-scanning direction and the result of the detection of the dimension of the same in the sub-scanning direction, and displays information indicative of the detected size of the original 101 on the display section 404. Further, the scanner controller 403 executes an original size-detecting process which will be described in detail hereinafter with reference to a flowchart shown in FIG. 12 (first embodiment) or FIGS. 17A and 17B (second embodiment).

Figure 5:
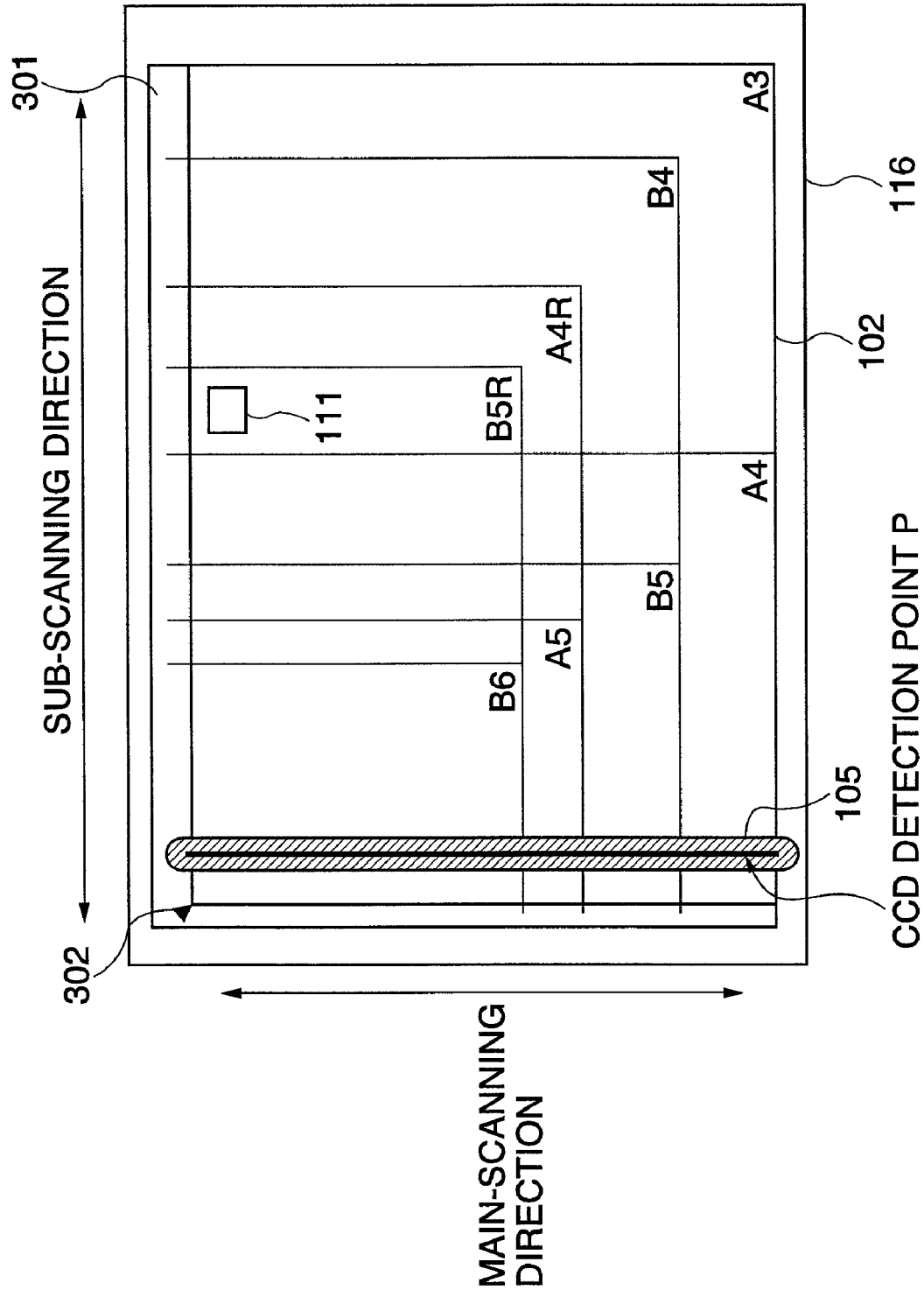
FIG. 5 is a plan view useful in explaining detection points for use in determining the size of an original placed on the original platen glass of the image reading apparatus in FIG. 1.

FIG. 5 is a plan view useful in explaining detection points for use in determining the size of an original 101 on the original platen glass 102 of the image reading apparatus in FIG. 1.

As shown in FIGS. 1 to 3 and 5, the original size sensor 111 is disposed at a detection point positioned below the original platen glass 102 at a location slightly rightward of the center of the original platen glass 102 in the sub-scanning direction and close to an inner edge of the original size label 301. In the illustrated example, the original size sensor 111 is disposed at a position (detection point) where originals of B6, A5, B5, and A4 sizes (undetectable group) cannot be detected, but originals of B5R, A4R, B4, and A3 sizes (detectable group) can be detected. Whether the dimension of an original in the sub-scanning direction belongs to those of the undetectable group or those of the detectable group can be determined based on the output from the original size sensor 111. The first optical bench 105 is disposed at a location corresponding to a left end portion of the original platen glass 102 in the sub-scanning direction, and is driven by the optical motor 402 to move to a CCD detection point P for detecting the dimension of an original in the main-scanning direction. The scanner controller 403 determines an original size based on the presence or absence of output from the original size sensor 111 and data detected by the CCD 110.

Next, the original size-detecting process carried out in the image reading apparatus will be described with reference to FIGS. 1 to 15.

Figure 6:
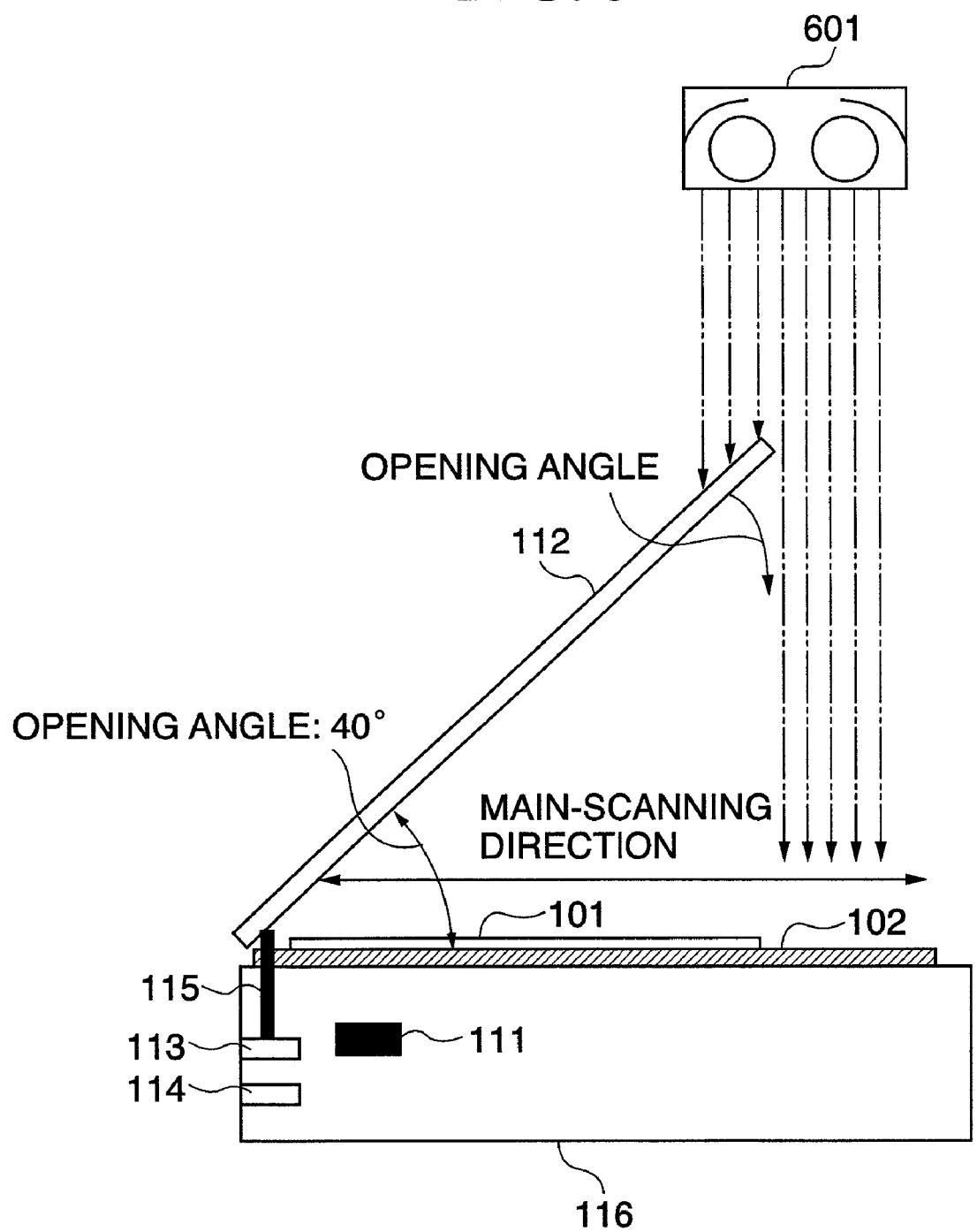
FIG. 6 is a view useful in explaining original size detection in a case where there are fluorescent lamps above the image reading apparatus in FIG. 1.

A description is given of a case where there is an external light source, such as fluorescent lamps 601, above the image reading apparatus, as shown in FIG. 6.

First, for purposes of ease of understanding of effects of the present embodiment, an inconvenience that occurs in a case where the optical sensor 113 is not provided, i.e. when the conventional original size detecting method is employed in which the opening angle of the original presser plate 112 is detected by the single optical sensor 114 alone will be explained below with reference to FIG. 7.

Figure 7:
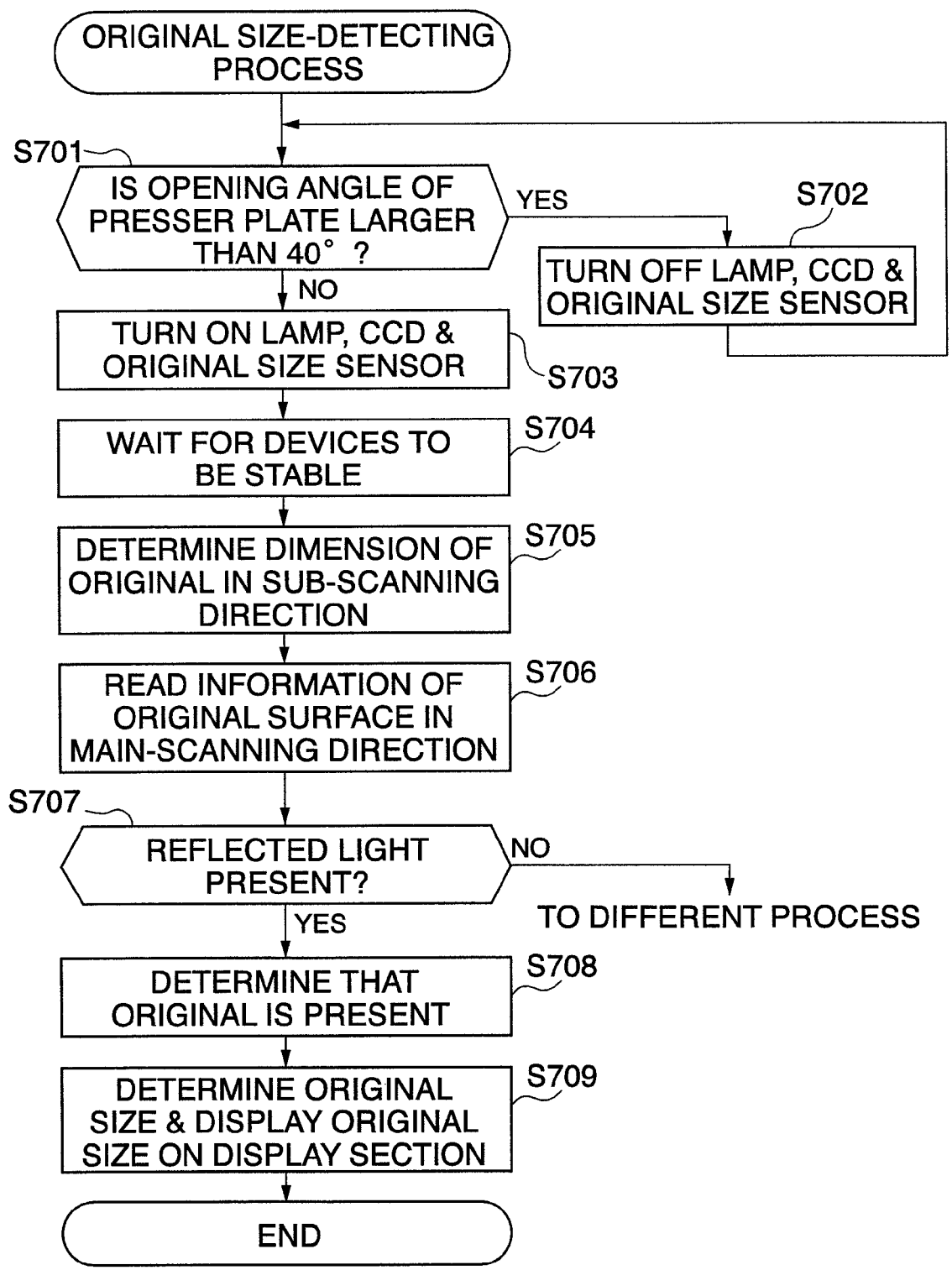
FIG. 7 is a flowchart of an original size-detecting process carried out by a conventional original size detecting method.

FIG. 7 is a flowchart of an original size-detecting process carried out according to the conventional original size detecting method.

First, in a step S701, the scanner controller 403 of the image reading apparatus checks the status of the optical sensor 114. Here, it is determined whether or not the opening angle of the original presser plate 112 is larger than 40 degrees. If it is determined that the original presser plate 112 larger than 40 degrees, the light source 103, the CCD 110, and the original size sensor 111 are turned off for energy saving in a step S702, and the process returns to the step S701.

Figure 8:
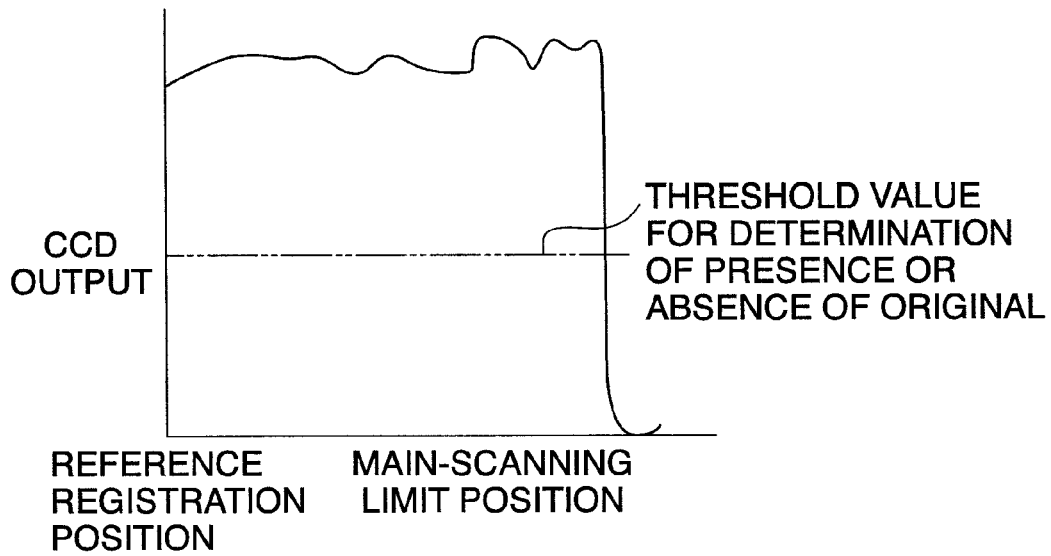
FIG. 8 is a diagram showing an example of a result of original reading by the conventional original size detecting method.

Then, when the optical sensor 114 detects that the opening angle of the original presser plate 112 has changed from a range larger than 40 degrees to a range equal to or smaller than 40 degrees, the scanner controller 403 judges that the user of the apparatus has started to close the original presser plate 112, and turns on the light source 103, the CCD 110, and the original size sensor 111 in a step S703. Then, in a step S704, after having waited for stabilization of the devices turned on, the scanner controller 403 causes the original size sensor 111 to operate. In a step S705, the scanner controller 403 determines, based on a binary output signal from the original size sensor 111, whether or not the original 101 is present, and determines the dimension of the original 101 in the sub-scanning direction. Further, in a step S706, the scanner controller 403 turns on the light source 103 and causes information of the surface of the original 101 in the main-scanning direction to be read by the CCD 110. Then, in a step S707, the scanner controller 403 reads an output signal from the CCD 110 as a digital signal through the A/D converter circuit 401, and determines, based on a predetermined threshold value, whether or not reflected light from the original 101 is present. If the reflected light from the original 101 is present, the process proceeds to a step S708, wherein the scanner controller 403 determines that there is an original if the digital signal is larger than the threshold value. The result of the reading of the original 101 is shown in FIG. 8.

Thereafter, in a step S709, the scanner controller 403 determines the size of the original as shown in FIG. 14, based on the result of the determination based on the detection by the original size sensor 111 in the sub-scanning direction and the result of the determination based on the detection of the surface of the original by the CCD 110 in the main-scanning direction, and displays information indicative of the result of the determination so as to inform the user of the result of the determination, followed by terminating the present process.

On the other hand, if there is no reflected light in the step S707, the present process is switched to another process.

Figure 9:
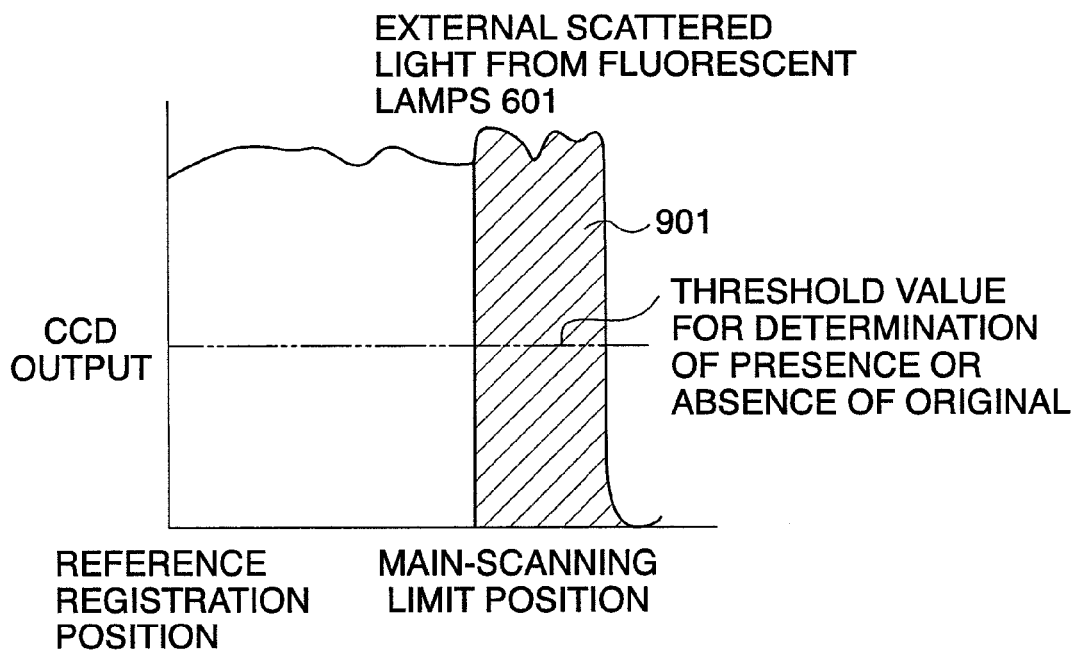
FIG. 9 is a diagram useful in explaining an inconvenience in the original reading by the conventional original size detecting method.

In the conventional original size detecting method described above, the size of an original is detected when the opening angle of the original presser plate 112 is large (larger than 40 degrees), which affects the output from the CCD 110. More specifically, as shown in FIG. 9, external scattered light from the fluorescent lamps 601 affects the output from the CCD 110, and as a result, the dimension of the original in the main-scanning direction is erroneously detected due to the external light incident on an range (a diagonally shaded area 901) outside a predetermined main-scanning limit position corresponding to the size of the original appearing in FIG. 9.

Figure 10:
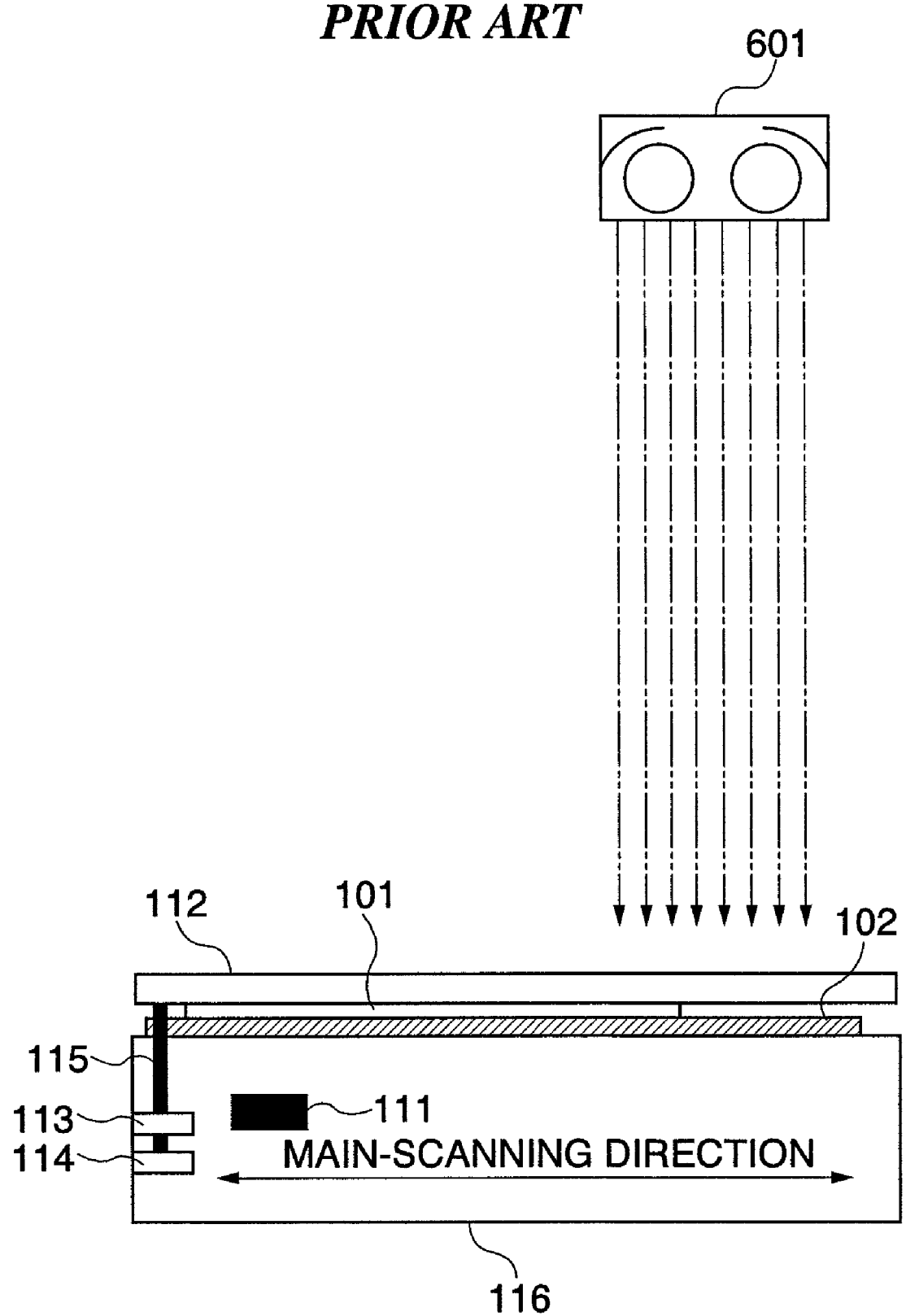
FIG. 10 is a view useful in explaining the conventional original size detecting method carried out with an opening angle of an original presser plate being reduced.
Figure 11:
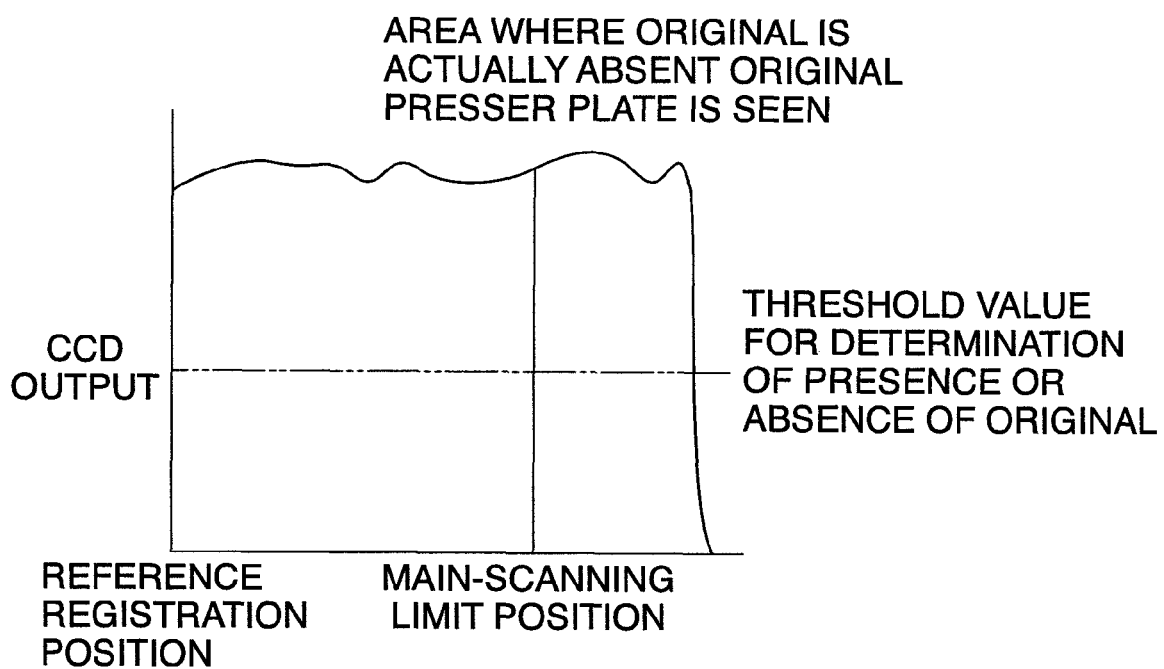
FIG. 11 is a diagram useful in explaining an inconvenience in the conventional original size detecting method carried out with the opening angle of the original presser plate being reduced.

If the opening angle of the original presser plate 112 is set to a smaller value of e.g. 15 degrees so as to prevent the erroneous detection described above, and the light source 103, the CCD 110, and the original size sensor 111 are turned on at this opening angle, followed by waiting for stabilization of the devices, this brings about the following problem: When the apparatus user closes the original presser plate 112 hurriedly, for example, detection of the original size is performed after the original presser plate 112 is completely closed as shown in FIG. 10. In this case, when information of the original surface in the main-scanning direction is read by the CCD 110 after the light source 103 is lighted, due to reflected light from the underside surface of the original presser plate 112, output values of the CCD 110 as a result of the reading are as shown in FIG. 11. This makes it impossible to distinguish the white color of the underside surface of the original presser plate 112 from that of the original 101, similarly to the case where external scattered light is incident on the original platen glass 102.

Figure 12:
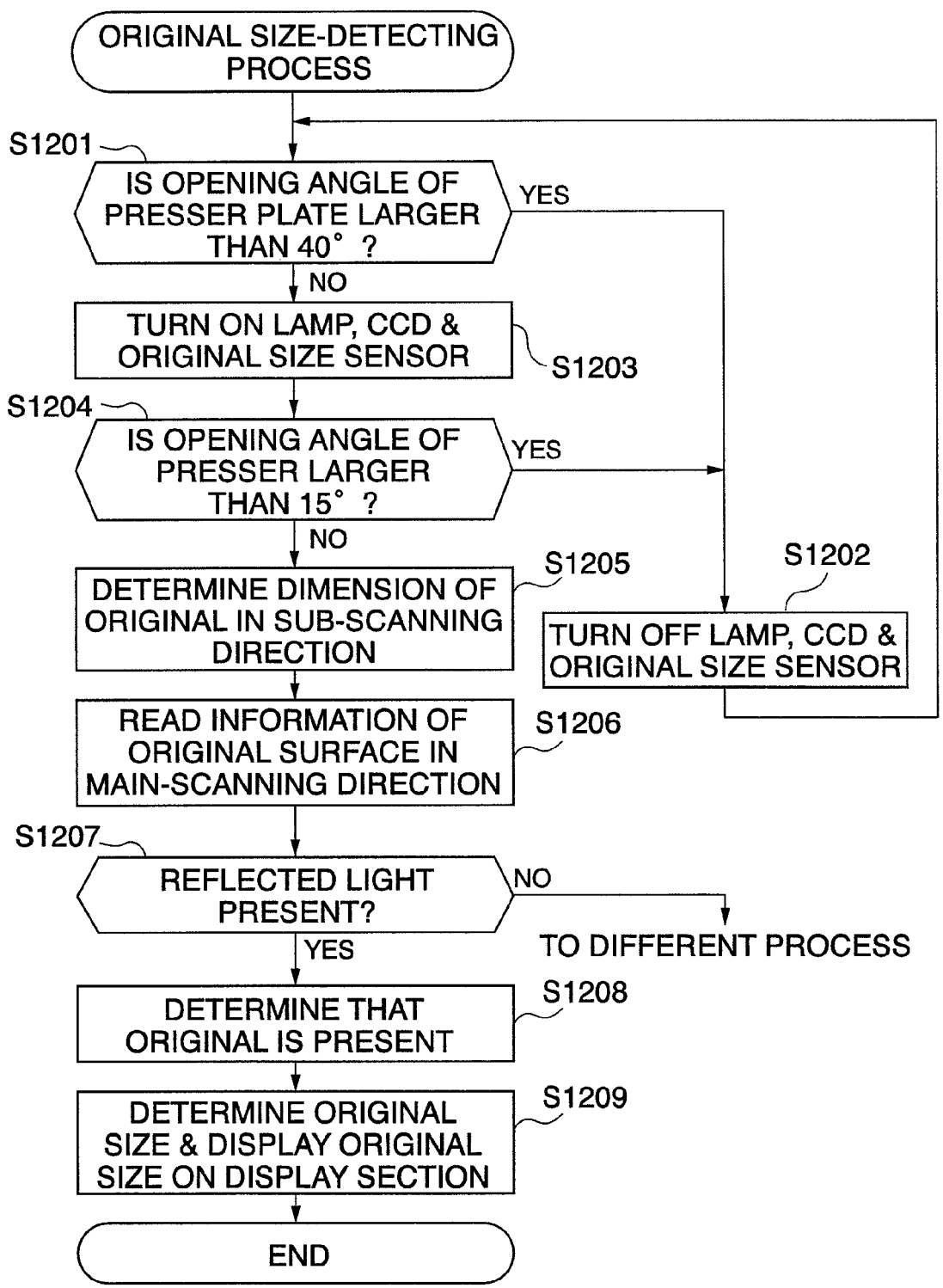
FIG. 12 is a flowchart of an original size-detecting process carried out by the image reading apparatus in FIG. 1.

Next, the detection process carried out by the original size detecting apparatus according to the present embodiment, which has been proposed to solve the above problems, will be described with reference to FIG. 12.

First, in a step S1201, the scanner controller 403 of the image reading apparatus checks the status of the optical sensor 113. More specifically, it is determined, based on an output signal from the optical sensor 113, whether or not the opening angle of the original presser plate 112 is larger than 40 degrees. If it is determined that the opening angle of the original presser plate 112 is larger than 40 degrees, the light source 103, the CCD 110, and the original size sensor 111 are turned off for energy saving in a step S1202, followed by the process returning to the step S1201.

Then, when the opening angle of the original presser plate 112 is equal to or smaller than 40 degrees in the step S1201, the process proceeds to a step S1203, wherein the scanner controller 403 judges that the original presser plate 112 has started to be closed, and turns on the light source 103, the CCD 110, and the original size sensor 111 as a preliminary step for detection of the size of an original.

Then, in a step S1204, the scanner controller 403 checks the status of the optical sensor 114. More specifically, it is determined, based on an output signal from the optical sensor 114, whether or not the opening angle of the original presser plate 112 is larger than 15 degrees.

If it is detected that the opening angle of the original presser plate 112 has changed to an angle equal to or smaller than 15 degrees, the process proceeds to a step S1205, wherein the original size sensor 111 is caused to operate, and the presence or absence of an original and the dimension of the original in the sub-scanning direction are determined based on the binary output signal from the original size sensor 111. Then, in a step S1206, the scanner controller 403 turns on the light source 103 and causes information of the surface of the original in the main-scanning direction to be read by the CCD 110.

Figure 13:
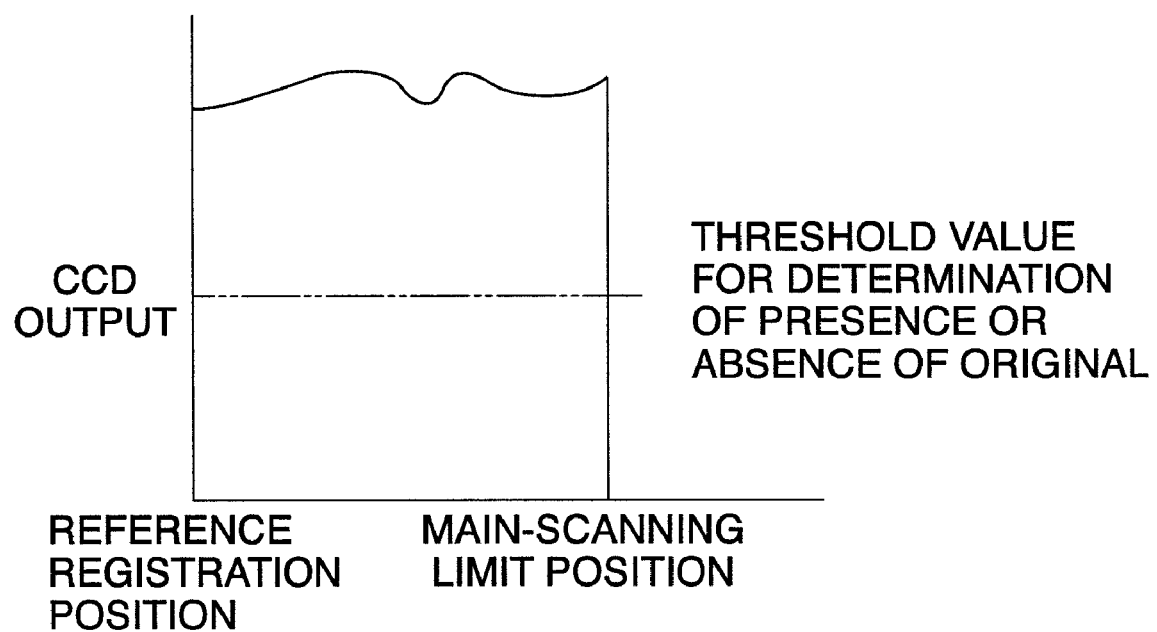
FIG. 13 is a diagram showing an example of a result of original reading by the image reading apparatus.
Figure 15:
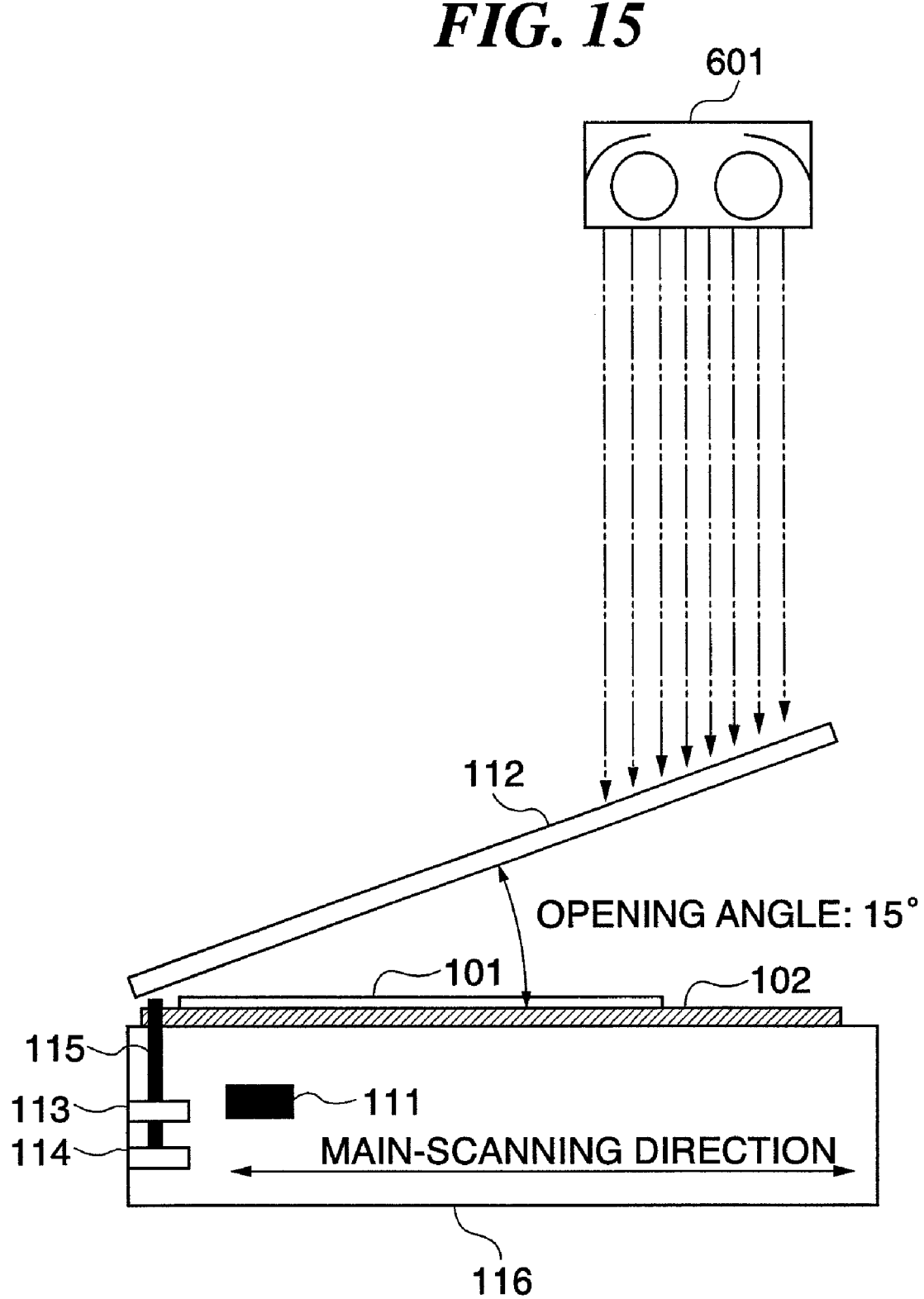
FIG. 15 is a view useful in explaining detection carried out with the opening angle of the original presser plate being reduced to 15 degrees.

Then, in a step S1207, the scanner controller 403 reads the output signal from the CCD 110 as the digital signal through the A/D converter circuit 401, and determines, based on a preset threshold value, whether or not reflected light from the original 101 is present. If the reflected light is present, the process proceeds to a step S1208, wherein the scanner controller 403 determines that there is an original if the digital signal is larger than the threshold value. The result of the reading of the original 101 is shown in FIG. 13.

Thereafter, in a step S1209, the scanner controller 403 determines the size of the original as shown in FIG. 14, based on the result of the determination based on the detection by the original size sensor 111 in the sub-scanning direction and the result of the determination based on the detection of the surface of the original by the CCD 110 in the main-scanning direction, and displays information indicative of the result of the determination so as to inform the user of the result of the determination. The reading by the CCD 110 in the present embodiment is performed after the opening angle of the original presser plate 112 has become equal to or smaller than 15 degrees, so that it is possible to prevent external scattered light from being incident on the original platen glass 102, to thereby carry out accurate detection of the original size. Further, when the opening angle of the original presser plate 112 starts to decrease into a range equal to or smaller than 40 degrees, the preliminary step for original size detection is started, so that when the opening angle of the original presser plate 112 has become equal to or smaller than 15 degrees, it is possible to execute the original size-detecting process immediately.

If it is determined in the step S1207 that there is no reflected light, the present process is switched to another process.

As described above, the original size detecting apparatus according to the present embodiment is comprised of the original platen glass 102 having the original size label 301 disposed on the perimeter thereof and the original alignment mark 302 formed at the reference registration position of the original size label 301, the light source 103 for irradiating light onto an original 101 on the original platen glass 102, the CCD 110 for reading an image of the original 101 on the original platen glass 102, the original presser plate 112 for pressing the original 101 against the upper surface of the original platen glass 102, the optical sensors 113 and 114 for detecting the opening angle of the original presser plate 112, the scanner controller 403 for turning on the light source 103 depending on the statuses of the optical sensors 113 and 114 and determining the size of the original 101 on the original platen glass 102, based on the output from the CCD 110 having read the original surface, and the display section 404 for displaying the result of the determination by the scanner controller 403 to inform a user of the same. As a result, the operation of the original size detecting apparatus according to the present embodiment has operations given below and thereby provides the following advantageous effects:

With the arrangement described above, the scanner controller 403 detects the two-stage changes in the opening angle of the original presser plate 112 from the respective statuses of the optical sensors 113 and 114, and turns on the light source 103, the CCD 110 and the original size sensor 111 immediately after the original presser plate 112 having entered a first-stage opening angle range, as a preliminary step for the original size detection. Then, after determining the dimension of an original 101 in the sub-scanning direction when the original presser plate 112 has entered a second-stage opening angle range, the scanner controller 403 determines, based on the result of comparison of the output from the CCD 110 with the preset threshold value, whether or not reflected light is present, and determines that the reflected light is present, i.e., the original 101 is present.

Therefore, the original size detecting apparatus of the present embodiment is capable of carrying out original size detection when the opening angle of the original presser plate 112 is small and optimal, in accordance with a closing operation of the original presser plate 112 carried out by a user, which makes it possible to suppress occurrence of erroneous detection due to external scattered light and perform accurate original size detection.

Next, a second embodiment of the present invention will be described with reference to FIGS. 16, 17A and 17B.

The basic construction of an image reading apparatus as an original size detecting apparatus according to the second embodiment is the same as that of the image reading apparatus shown in FIG. 1 as the original size detecting apparatus according to the first embodiment, and hence the following description will be given with reference to FIG. 1 as required.

Figure 16:
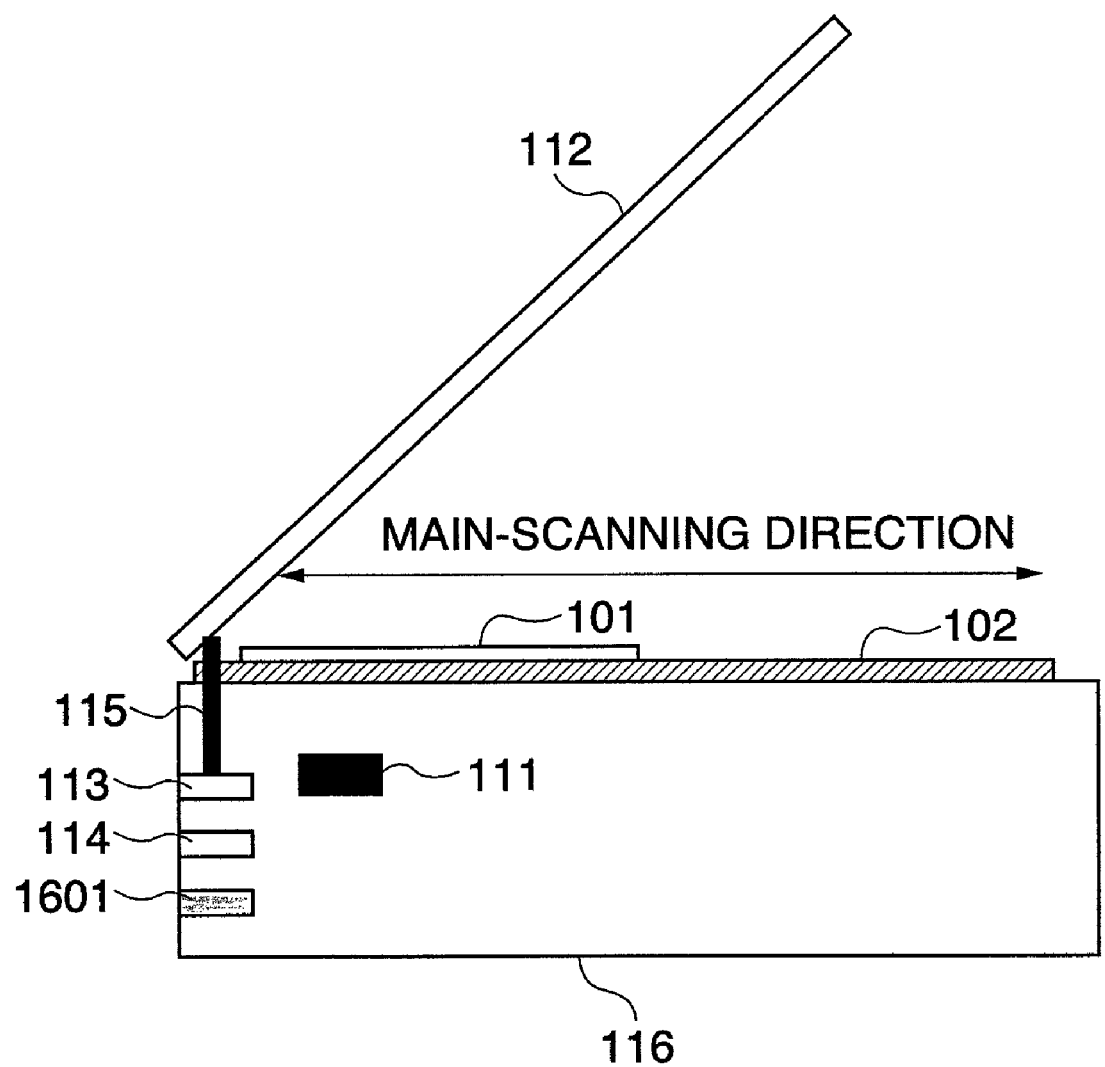
FIG. 16 is a side view schematically showing the construction of an image reading system of an image reading apparatus as an original size detecting apparatus according to a second embodiment of the present invention.

FIG. 16 is a side view schematically showing the construction of the image reading system of the image reading apparatus as the original size detecting apparatus according to the present embodiment. In FIG. 16, component parts identical to those in FIG. 2 according to the first embodiment are designated by identical reference numerals.

FIG. 16 is distinguished from FIG. 2 in that an optical sensor 1601 is additionally provided so as to enable detection of the opening angle of the original presser plate 112 in three stages (e.g. 40 degrees, 25 degrees, and 15 degrees). The optical sensor 113 is used to determine whether or not the opening angle of the original presser plate 112 is larger than 40 degrees, the optical sensor 114 is used to determine whether or not the opening angle of the original presser plate 112 is larger than 25 degrees, and the optical sensor 1601 is used to determine whether or not the opening angle of the original presser plate 112 is larger than 15 degrees. The other component parts are the same as the corresponding ones of the first embodiment in FIG. 2, and hence description thereof is omitted.

Next, an original size-detecting process carried out by the image reading apparatus constructed as above will be described with reference to FIGS. 1 to 5 and FIGS. 13, 14, 16, 17A and 17B.

Figure 17A:
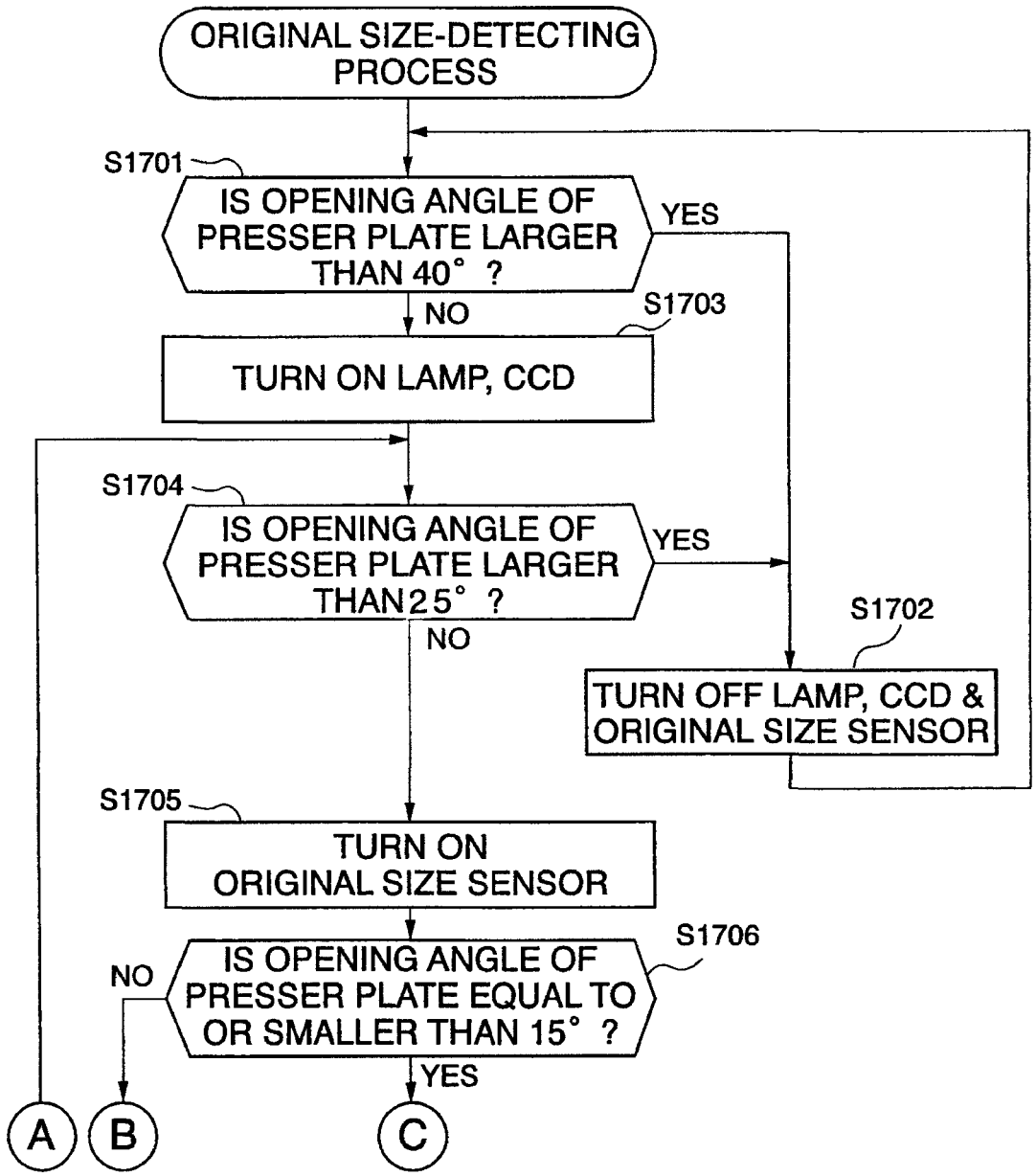
FIGS. 17A and 17B are flowchart of an original size-detecting process carried out by the image reading apparatus shown in FIG. 16.
Figure 17B:
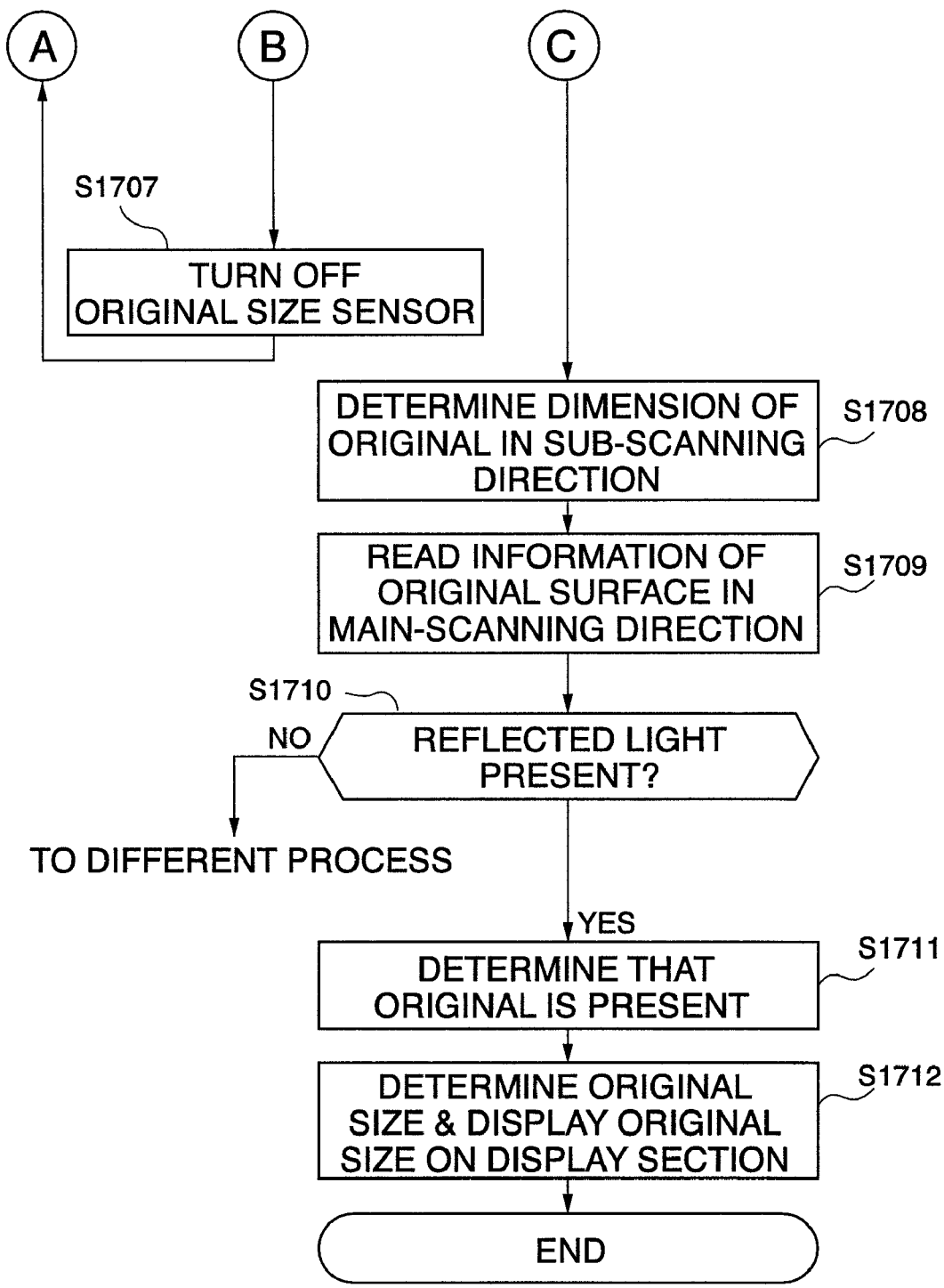

FIGS. 17A and 17B are flowchart of the original size-detecting process carried out by the image reading apparatus shown in FIG. 16.

First, in a step S1701, the scanner controller 403 of the image reading apparatus checks the status of the optical sensor 113. More specifically, it is determined, based on an output signal from the optical sensor 113, whether or not the opening angle of the original presser plate 112 is larger than 40 degrees. If it is determined that the opening angle of the original presser plate 112 is larger than 40 degrees, the light source 103, the CCD 110, and the original size sensor 111 are turned off for energy saving in a step S1702, followed by the process returning to the step S1701.

On the other hand, if it is determined that the opening angle of the original presser plate 112 has become equal to or smaller than 40 degrees in the step S1701, the process proceeds to a step S1703, wherein the scanner controller 403 judges that the original presser plate 112 has started to be closed, and turns on the light source 103, and the CCD 110, as a preliminary step for the original size detection, since it takes time before their operations become stable after turning-on. Then, in a step S1704, the scanner controller 403 checks the status of the optical sensor 114. More specifically, it is determined, based on an output signal from the optical sensor 114, whether or not the opening angle of the original presser plate 112 is larger than 25 degrees. If it is determined that the opening angle of the original presser plate 112 is equal to or smaller than 25 degrees, the process proceeds to a step S1705, wherein the original size sensor 111 is turned on, since it does not take much time before the operation thereof becomes stable after turning-on. Then, in a step S1706, the scanner controller 403 checks the status of the optical sensor 1601. More specifically, it is determined, based on an output signal from the optical sensor 1601, whether or not the opening angle of the original presser plate 112 is equal to or smaller than 15 degrees. If the opening angle of the original presser plate 112 is larger than 15 degrees, i.e. if the opening angle of the original presser plate 112 is held in a range of 25 degrees to 15 degrees, the original size sensor 111 is turned off in a step S1707, followed by the process returning to the step S1704.

If the opening angle of the original presser plate 112 is equal to or smaller than 15 degrees in the step S1706, the process proceeds to a step S1708, wherein the original size sensor 111 is caused to operate, whereby the presence or absence of an original and the dimension of the original in the sub-scanning direction are determined based on a binary output signal from the original size sensor 111. Then, in a step S1709, the scanner controller 403 turns on the light source 103 and causes information of the surface of the original in the main-scanning direction to be read by the CCD 110. Then, in a step S1710, the scanner controller 403 reads an output signal from the CCD 110 as a digital signal through the A/D converter circuit 401, and determines, with reference to a preset threshold value, whether or not reflected light from the original 101 is present. If the reflected light is present, the process proceeds to a step S1711, wherein the scanner controller 403 determines that there is an original if the digital signal is larger than the threshold value. The result of the reading of the original 101 is shown in FIG. 13.

Thereafter, in a step S1712, the scanner controller 403 determines the size of the original as shown in FIG. 14, based on the result of the determination based on the detection by the original size sensor 111 in the sub-scanning direction and the result of the determination based on the detection of the surface of the original by the CCD 110 in the main-scanning direction, and displays information indicative of the result of the determination so as to inform the user of the result of the determination, followed by terminating the present process.

As described above, the original size detecting apparatus of the present embodiment is comprised of the light source 103 for irradiating light onto an original 101 on the original platen glass 102, the CCD 110 for reading an image of the original 101 on the original platen glass 102, the original presser plate 112 for pressing the original 101 against the upper surface of the original platen glass 102, the optical sensors 113, 114, and 1601 for detecting the opening angle of the original presser plate 112, the scanner controller 403 for turning on the light source 103 depending on the statuses of the optical sensors 113, 114, and 1601 and determining the size of the original 101 on the original platen glass 102, based on the output from the CCD 110 having read the original surface, and the display section 404 for displaying the result of the determination by the scanner controller 403 to inform a user of the same. As a result, the operation of the original size detecting apparatus according to the present embodiment has operations given below and thereby provides the following advantageous effects:

With the arrangement described above, the scanner controller 403 detects the opening angle of the original presser plate 112 from the statuses of the respective optical sensors 113, 114, and 1601 and, immediately after the original presser plate 112 having entered a first-stage opening angle range, turns on the light source 103 and the CCD 110 since it takes time before the operations of these devices become stable after turning-on, as a preliminary step for the original size detection. Then, when the original presser plate 112 has entered a second-stage opening angle range, the original size sensor 111 is turned on, since it does not take much time before the operation of the sensor 111 becomes stable after turning-on, and after determining the dimension of an original 101 in the sub-scanning direction when the original presser plate 112 has entered a third-stage opening angle range, the scanner controller 403 determines, based on the result of comparison of the output from the CCD 110 with the preset threshold value, whether or not reflected light from the original 101 is present, and if the reflected light is present, determines that the reflected light is present, i.e., the original 101 is present.

Therefore, according to the present embodiment, each of the devices used for original size detection can be turned on, when the opening angle of the original presser plate 112 has entered optimal opening angle ranges which are set in consideration of time periods required for stabilization of these devices after turning-on, and therefore, original size detection can be carried out when the opening angle of the original presser plate 112 is small and optimal, which makes it possible to suppress occurrence of erroneous detection due to external scattered light and perform accurate original size detection.

Next, a third embodiment of the present invention will be described with reference to FIGS. 18A to 23.

The basic construction of an image reading apparatus as an original size detecting apparatus according to the present embodiment is the same as that of the image reading apparatus shown in FIG. 1 as the original size detecting apparatus according to the first embodiment, and hence description thereof is omitted.

Figure 18A:
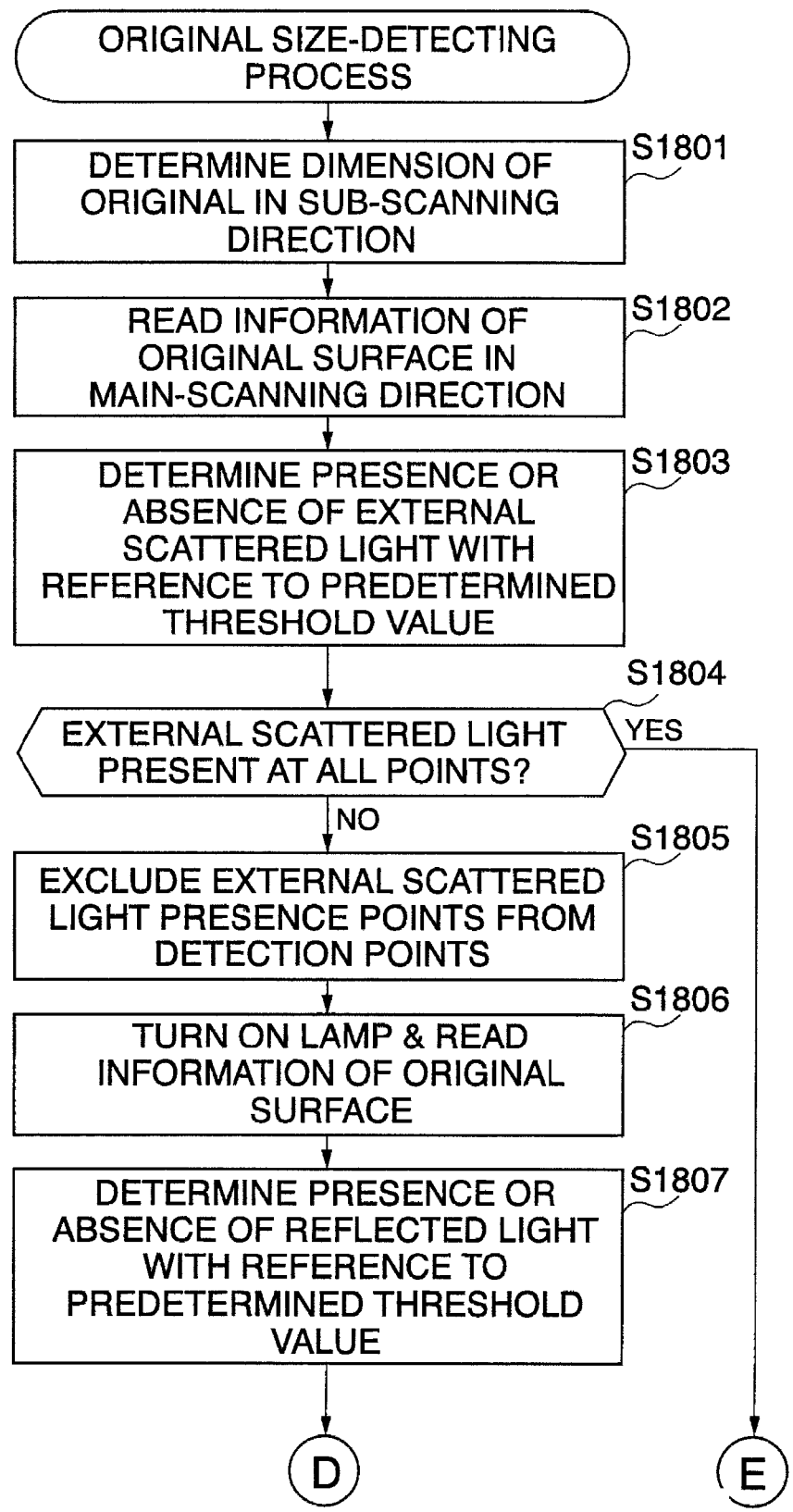
FIGS. 18A and 18B are flowchart of an original size-detecting process carried out by an image reading apparatus as an original size detecting apparatus according to a third embodiment of the present invention.
Figure 18B:
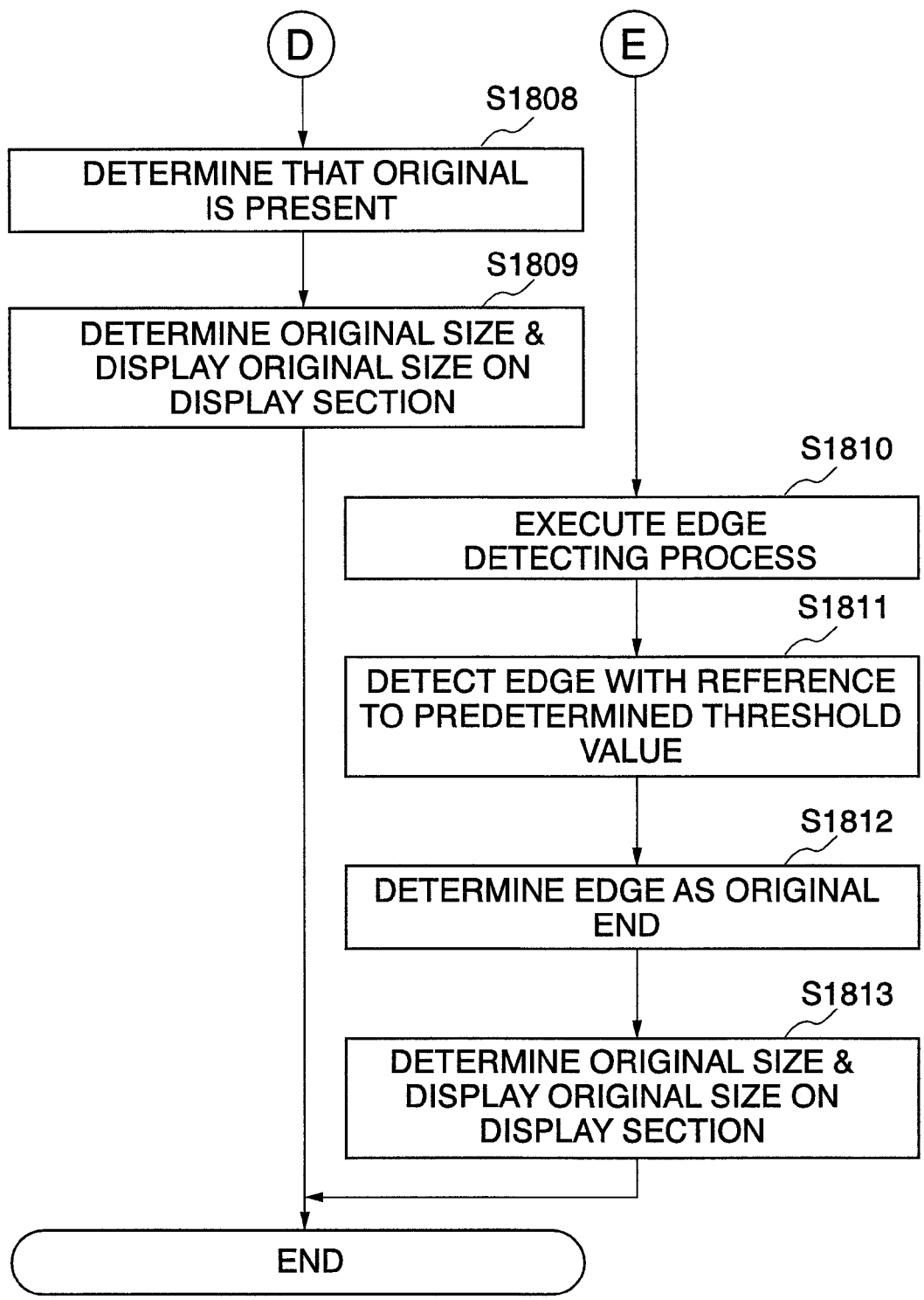

FIGS. 18A and 18B are flowchart of an original size-detecting process carried out by the image reading apparatus as the original size detecting apparatus according to the present embodiment.

In this original size detecting method, processing is different between a case where the CCD 110 is hardly affected by external scattered light (first original size-detecting process: steps S1801 to S1809) and a case where the CCD 110 is easily affected by external scattered light (second original size-detecting process: steps S1801 to S1804, S1810 to S1813).

First, a description will be given of the case where the CCD 110 is hardly affected by external scattered light (steps S1801 to S1809). The CCD 110 is hardly affected by external scattered light e.g. when the transmittance of an original 101 is low or when the sensitivity of the CCD 110 is low.

The scanner controller 403 of the image reading apparatus causes the original size sensor 111 to operate to detect the dimension of the original in the sub-scanning direction, whereby the presence or absence of an original 101 on the original platen glass 102 and the dimension of the original 101 in the sub-scanning direction are determined based on a binary output signal from the original size sensor 111 (step S1801). By this determination, the dimension of the original 101 in the sub-scanning direction is determined as one of an original belonging to the undetectable group or one of an original belonging to the detectable group.

In this step, when the original size sensor 111 detects an original 101 on the original platen glass 102, the size of the original 101 is determined to belong to the group consisting of the standard sizes B5R, A4R, B4 and A3 (detectable group), for example. On the other hand, when the original size sensor 111 does not detect the original 101 on the original platen glass 102, the size of the original 101 is determined to belong to the group consisting of the standard sizes B6, A5, B5 and A4 (undetectable group)

Figure 19:
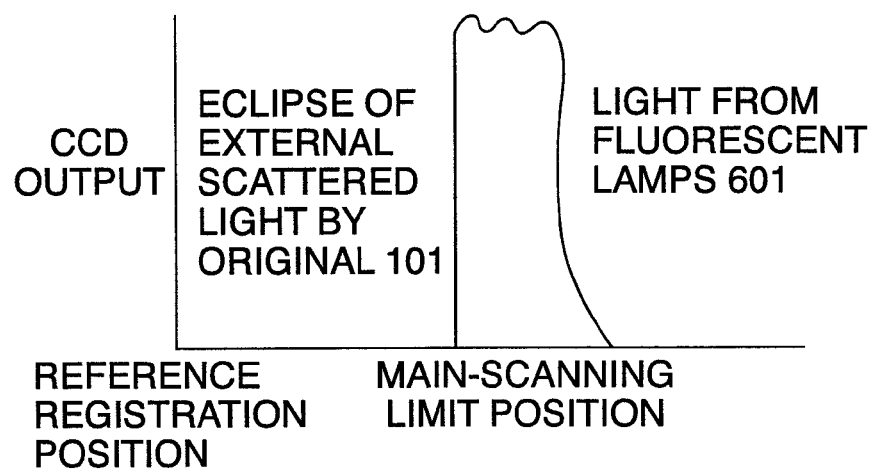
FIG. 19 is a diagram useful in explaining the relationship between an output characteristic of a CCD and a main-scanning limit position in a case where the fluorescent lamps are off.

Then, the scanner controller 403 turns off the light source 103 and causes information of the original surface in the main-scanning direction to be read by the CCD 110 (step S1802). The output characteristic of the CCD 110 in the operation is shown in FIG. 19. FIG. 19 shows the relationship between the output characteristic of the CCD 110 and a pre-determined main-scanning limit position corresponding to the size of the original.

As shown in FIG. 19, in a portion of the original platen glass 102 where the original 101 is placed, the transmittance of light transmitted through the original 101 is low, and therefore, light from the fluorescent lamps 601 is eclipsed (blocked), and hence there is no output from the CCD 110. On the other hand, through a portion of the original platen glass 102 where the original 101 is not present, light from the fluorescent lamps 601 is transmitted as external scattered light and is incident on the CCD 110, which causes the CCD 110 to generate an output.

The scanner controller 403 makes use of the external scattered light being eclipsed or blocked by the original 101 on the original platen glass 102, that is, it receives an output signal from the CCD 110 as a digital signal through the A/D converter circuit 401, and compares the value of the digital signal with a preset threshold value to thereby determine the presence or absence of external scattered light (step S1803). Whether or not external scattered light is present at all points on the surface area of the original plate glass 102 read by the CCD 110 is determined based on whether or not the digital signal contains components having smaller values than the threshold value (step S1804). It is assumed here, however, that the CCD 110 is hardly affected by external scattered light, and hence the digital signal contains components having smaller values than the threshold value, which means that external scattered light is not present at all of the points in the surface area read by the CCD 110. Therefore, the answer to the question of the step S1804 is negative (NO). It should be noted that although in the present embodiment, it is detected in the step S1804 whether or not external scattered light is present at all of the points in the surface area read by the CCD 110, when it takes time to carry out detection at all of the points in the surface area read by the CCD 110, for example, detection may be performed only at a plurality of predetermined points.

Figure 20:
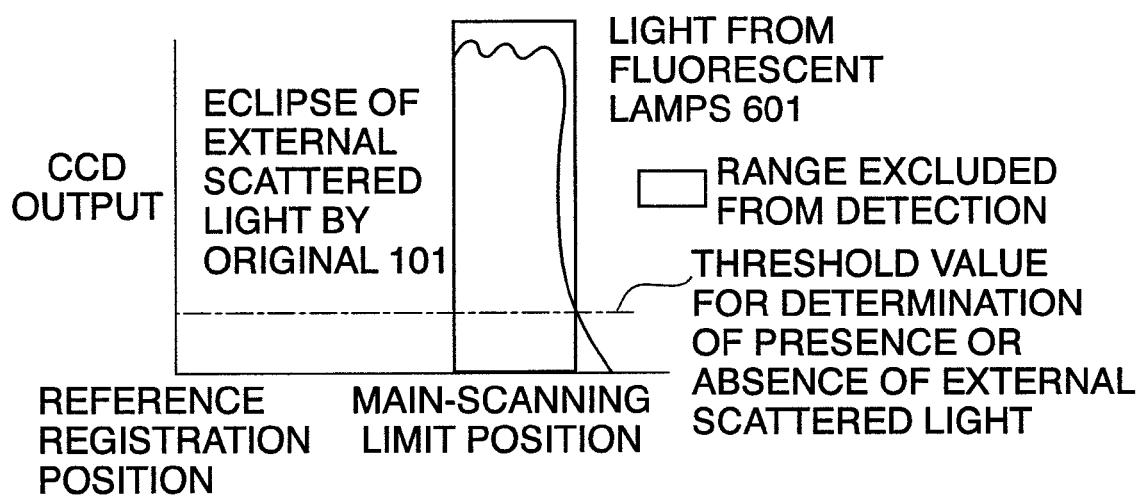
FIG. 20 is a diagram showing a range excluded from the detection based on the output from the CCD.

Then, points where it is determined that external scattered light is present are excluded from detection points (step S1805). The points thus excluded are shown in FIG. 20. FIG. 20 is a diagram showing a range excluded from the detection based on the output from the CCD 110.

Figure 21:
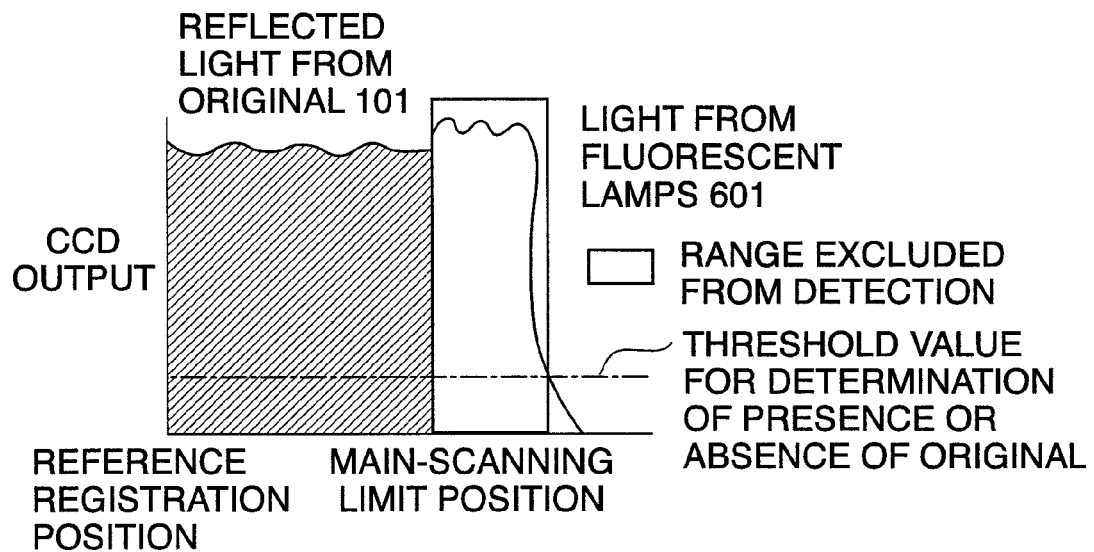
FIG. 21 is a diagram useful in explaining the relationship between the output from the CCD and the main-scanning limit position in a case where the fluorescent lamps are on, as well as a range excluded from the detection based on the output from the CCD.

Then, the scanner controller 403 turns on the light source 103 and causes original surface information to be read by the CCD 110 (step S1806). The output characteristic of the CCD 110 is shown in FIG. 21. FIG. 21 shows the relationship between the output from the CCD 110 and the predetermined main-scanning limit position corresponding to the size of an original, and the range excluded from the detection based on the output from the CCD 110.

Then, the scanner controller 403 reads a digital signal obtained by converting an output signal from the CCD 110 using the A/D converter circuit 401, and determines the presence or absence of reflected light from the original, based on whether or not the digital signal is larger than a preset threshold value (step S1807). Then, the scanner controller 403 determines a portion of the surface of the original platen glass 102 (reflected light present points) where the value of the digital signal is larger than the threshold value as an original existing portion (step S1808).

Thereafter, the scanner controller 403 determines the size of the original as shown in FIG. 14, based on the result of determination based on the detection of the dimension of the original in the sub-scanning direction by the original size sensor 111 and the result of determination based on the detection of the dimension of the original in the main-scanning direction by the CCD 110, and displays the result of the determination on the display section 404 so as to inform the user of the result of the determination (step S1809), followed by terminating the present process.

Next, a description will be given of the case where the CCD 110 is easily affected by external scattered light (steps S1801 to S1804, S1810 to S1813). The CCD 110 is easily affected by external scattered light e.g. when the transmittance of an original is high or when the sensitivity of the CCD 110 is high.

The steps S1801 to S1804 were explained in the above description of the case where the CCD 110 is hardly affected by external scattered light, and hence, duplicate description thereof is omitted. However, the output characteristic of the CCD 110 in the case where the CCD 110 is easily affected by external scattered light is different from that in the case where the CCD 110 is hardly affected by external scattered light.

Figure 22:
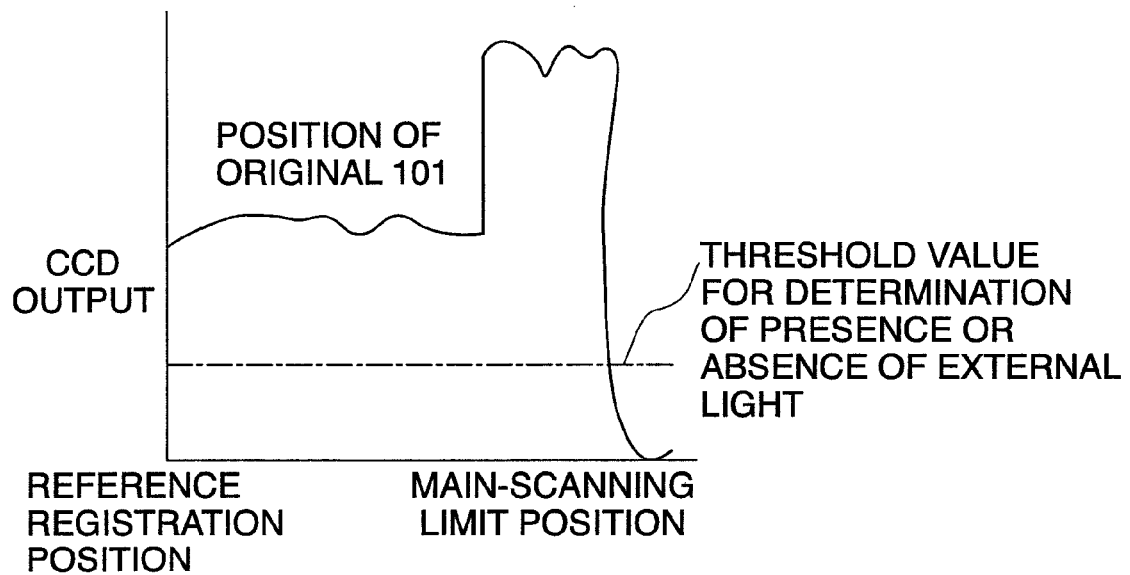
FIG. 22 is a diagram useful in explaining the relationship between the output characteristic of the CCD and the main-scanning limit position in a case where the CCD is easily affected by external scattered light.

Therefore, this difference will now be described below. FIG. 22 shows the relationship between the output characteristic of the CCD 110 in the case where the CCD 110 is easily affected by external scattered light and the predetermined main-scanning limit position corresponding to the size of an original.

As shown in FIG. 22, external scattered light (light from the fluorescent lamps 601) enters the CCD 110 through a portion of the original platen glass 102 where the original 101 is not present. Further, when the transmittance of the original 101 is high, even a portion of the original platen glass 102 where the original 101 is present allows external scattered light to pass therethrough and enter the CCD 110. In this case, the amount of external scattered light blocked by the original 101 is small, which can cause erroneous detection of the original size. However, a comparison between the amount of incoming external scattered light having passed through the portion of the original platen glass 102 where the original 101 is present and that of incoming external scattered light having passed through the portion where the original 101 is not present shows that in the portion where the original 101 is present, some amount of external scattered light enters the CCD 110 while a small amount of external scattered light is blocked by the original 101.

When it is determined in the step S1804 that there is external scattered light at all of the points in the surface area read by the CCD 110, an edge detecting process is carried out (step S1810) so as to execute the original size-detecting process in a manner different from that in the case where the CCD 110 is hardly affected by external scattered light. In this edge detecting process, a predetermined threshold value for detecting an eclipse of external scattered light by the original 101 is set based on information read in the step S1802. The predetermined threshold value is determined based on the transmittance of the original, the amount of external scattered light (e.g. the amount of light from fluorescent lamps in an ordinary office room or the like), the sensitivity of the CCD, and so forth.

Figure 23:
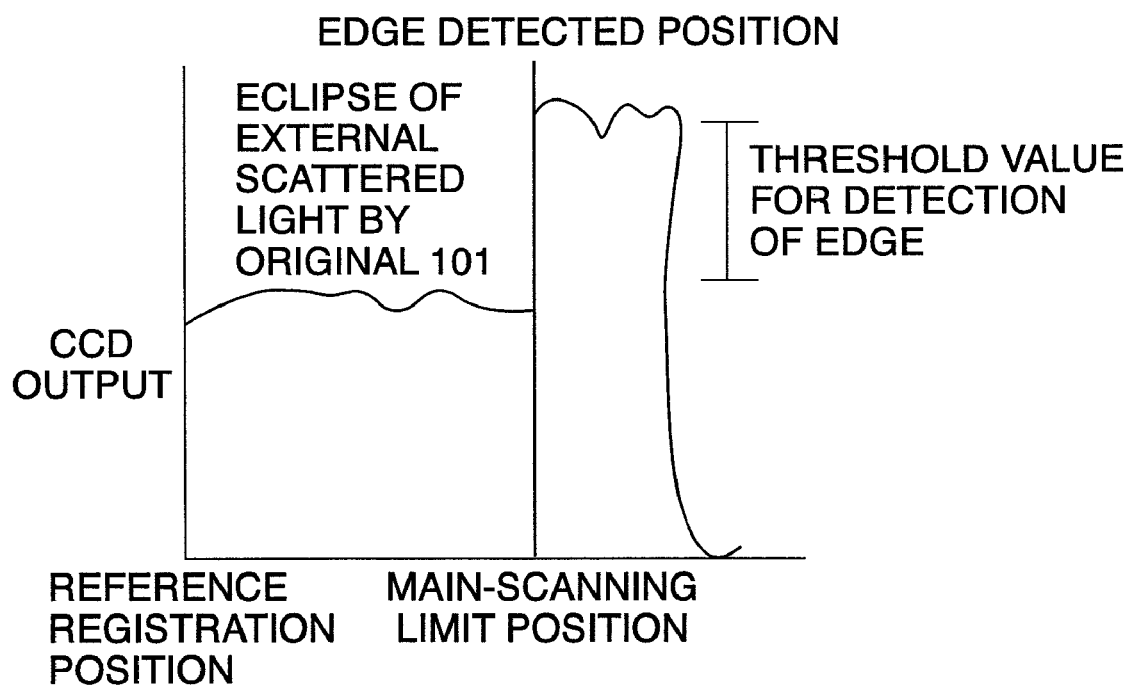
FIG. 23 is a diagram useful in explaining the relationship between the output characteristic of the CCD and an edge detected position.

Then, to detect an eclipse of external scattered light by the original 101, an edge or step in the output value of the CCD 110 is detected based on whether or not the difference between output values from the CCD 110 corresponding to respective two arbitrary points is equal to or larger than a predetermined threshold value (edge detecting threshold value) (step S1811). For example, when the difference between an output value of the CCD 110 corresponding to a predetermined position between a A4/A3 point (predetermined main-scanning limit position corresponding to the original sizes A4 and A3) and a B5/B4 point (predetermined main-scanning limit position corresponding to the original sizes B5 and B4), and an output value of the same corresponding to a predetermined position between the B5/B4 point and a A5/A4R point (predetermined main-scanning limit position corresponding to the original sizes A5 and A4R) is equal to or larger than the predetermined threshold value (edge detecting threshold value) as shown in FIG. 23, it is determined that there is an edge in the output from the CCD 110. Further, if it is determined that no edge is present, the difference between the output value of the CCD 110 corresponding to the predetermined position between the B5/B4 point and the A5/A4R point and an output value of the same corresponding to a predetermined position between the A5/A4R point and a B6/B5R point (predetermined main-scanning limit position corresponding to the original sizes B6 and B5R) is taken for detection of an edge. If it is determined that no edge is present, similarly to the above, edge detection is continued until it is checked if an edge of the minimum original size is detected.

Then, as shown in FIG. 23, a position on the original platen glass 102 where an edge is detected (edge detected position) is determined as the position of an end edge of the original (step S1812). That is, in the steps S1811 and S1812, the dimension of the original 101 in the main-scanning direction is detected (determined) based on the output values from the CCD 110.

Thereafter, the scanner controller 403 determines the size of the original as shown in FIG. 14, based on the result of determination based on the detection of the dimension of the original in the sub-scanning direction by the original size sensor 111 and the result of determination based on the detection of the dimension of the original in the main-scanning direction by the CCD 110, and displays the result of the determination on the display section 404 so as to inform the user of the result of the determination (step S1813), followed by terminating the present process.

According to the process described above, in both the cases where the CCD 110 of the image reading apparatus may be hardly affected and it is easily affected by external scattered light, the two types of original size-detecting process suited respectively to these cases are carried out, which enables accurate original size detection. Further, since the process is simple, the original size detection can be carried out with enhanced efficiency, which makes it possible to reduce detection time.

As described above, the original size detecting apparatus according to the present embodiment is comprised of the original platen glass 102 having the original size label 301 disposed on the perimeter thereof and the original alignment mark 302 formed in the reference registration position of the original size label 301, the light source 103 for irradiating light onto an original 101 on the original platen glass 102, and the CCD 110 for reading an image of the original 101 on the original platen glass 102. With this arrangement, the presence or absence of external scattered light is detected based on the output from the CCD 110. Then, during a light-out reading process in which the original surface is read with the light source 103 turned off, if it is determined that external scattered light is present at all of the points in the surface area of the original platen glass read by the CCD 110, the edge detecting process is carried out to thereby determine the size of the original on the original platen glass 102. If it is determined that external scattered light is not present at all of the points in the area read by the CCD 110, points where it was determined that there is external scattered light are excluded from points to be detected, and the original surface is read with the light source 103 turned on (i.e. by a light-on reading process), to thereby determine the size of the original on the original platen glass 102 based on output from the CCD 110. As a result, the size of the original can be detected with high accuracy without erroneous detection, and the original size detection can be carried out with enhanced efficiency to thereby enable shortening of the detection time.

It goes without saying that the original size-detecting process carried out by setting a plurality of predetermined opening angle range for the original presser plate 112 is not limited to those carried out in the above-described first and second embodiments.

Further, the present invention may either be applied to a system composed of a plurality of apparatuses (e.g. a host computer, interface equipment, a reader, and a printer) or to a single apparatus (e.g. a copying machine, a facsimile machine, or the like). It goes without saying that the object of the present invention may also be accomplished by supplying a system or an apparatus with a storage medium (or a recording medium) in which a program code of software, which realizes the functions of any of the above described embodiments is stored, and causing a computer (or CPU or MPU) of the system or apparatus to read out and execute the program code stored in the storage medium.

In this case, the program code itself read from the storage medium realizes the functions of a corresponding one of the above described embodiments, and hence the program code and the storage medium on which the program code is stored constitute the present invention.

Further, it is to be understood that the functions of any of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of any of the above described embodiments may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

Further, the above program has only to realize the functions of a corresponding one of the above-mentioned embodiments on a computer, and the form of the program may be an object code, a program executed by an interpreter, or script data supplied to an OS.

Examples of the storage medium for supplying the program code include a RAM, an NV-RAM, a floppy (registered trademark) disk, an optical disk, a magnetic-optical disk, a CD-ROM, an MO, a CD-R, a CD-RW, a DVD (a DVD-ROM, a DVD-RAM, a DVD-RW or a DVD+RW), a magnetic tape, a nonvolatile memory card, a ROM, and any other suitable storage medium on which the program code can be stored. Alternatively, the program may be supplied by downloading from another computer, a database, or the like, not shown, connected to the Internet, a commercial network, a local area network, or the like.

What is claimed is:

1. An original reading apparatus comprising:
an original platen;
an original pressing member that presses an original placed on the original platen;
a light source that irradiates light toward the original platen;
a reading device that reads reflected light of the light irradiated from the light source toward the original platen;
an open state-detecting device that detects that the original pressing member is closed down from a first open state to a second open state that is more closed than the first open state, and closed down from the second open state to a third open state that is not closed completely and more closed than the second open state; and
a control device that turns on the light source based on the open state-detecting device detecting that the original pressing member is closed down to the second open state from the first open state, and determine a size of the original based on a reading result of the reading device in a state in which the original pressing member is in the third open state.

2. An original reading apparatus as claimed in claim 1, wherein the control device turns off the light source in a state in which the original pressing member is in the first open state.

3. An original reading apparatus as claimed in claim 1, further comprising:
a detecting device that detects whether or not a dimension of the original in a first direction is equal to or smaller than a predetermined dimension; and
wherein the reading device reads the reflected light in a second direction perpendicular to the first direction, and the control device determines the size of the original based on an output from the detecting device and the output from the reading device.

4. An original reading apparatus comprising:
an original platen;
an original pressing member that presses an original placed on the original platen;
a light source that irradiates light toward the original platen;
a reading device that reads reflected light of the light irradiated from the light source toward the original platen;
an open state-detecting device that detects that the original pressing member is in a first open state, in a second open state that is more closed than the first open state, or in a third open state that is not closed completely and more closed than the second open state; and
a control device that turns on the light source based on the original pressing member being closed down to the second open state from the first open state, and determine a size of the original based on a reading result of the reading device in a state in which the original pressing member is in the third open state.

5. An original reading apparatus as claimed in claim 4, wherein the control device is operable to turn off the light source and the reflected light-reading device in a state in which the original pressing member is in the first open state.

6. An original reading apparatus as claimed in claim 4, further comprising:
a detecting device that detects whether or not a dimension of the original in a first direction is equal to or smaller than a predetermined dimension,
wherein the reading device reads the reflected light in a second direction perpendicular to the first direction, and the control device determines the size of the original based on an output from the detecting device and the output from the reading device.

* * * * *